US012049782B2

(12) United States Patent
Hellwig et al.

(10) Patent No.: US 12,049,782 B2
(45) Date of Patent: Jul. 30, 2024

(54) BACKPLATE FOR A DOOR ACTUATOR

(71) Applicant: dormakaba Deutschland GmbH, Ennepetal (DE)

(72) Inventors: Alexander Hellwig, Ennepetal (DE); Thomas Salutzki, Ennepetal (DE); Konstantin Lygin, Ennepetal (DE); Volker Bienek, Ennepetal (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 309 days.

(21) Appl. No.: 17/532,260

(22) Filed: Nov. 22, 2021

(65) Prior Publication Data

US 2022/0186527 A1 Jun. 16, 2022

(30) Foreign Application Priority Data

Dec. 14, 2020 (EP) .................................... 20213875

(51) Int. Cl.
*E05F 3/22* (2006.01)
*E05F 1/00* (2006.01)

(52) U.S. Cl.
CPC .............. *E05F 3/227* (2013.01); *E05F 1/006* (2013.01); *E05Y 2600/626* (2013.01)

(58) Field of Classification Search
CPC .......... E05F 1/006; E05F 3/227; E06B 5/167; E05Y 2900/134; E05Y 2600/626; E05Y 2800/414; E05Y 2800/416
See application file for complete search history.

(56) References Cited

U.S. PATENT DOCUMENTS

| | | | | |
|---|---|---|---|---|
| 4,847,946 A * | 7/1989 | Nam | E05F 3/221 | 16/53 |
| 5,551,187 A * | 9/1996 | Brouwer | E05F 1/006 | 49/1 |
| 5,709,009 A * | 1/1998 | Lasson | E05F 3/12 | 16/48.5 |
| 6,363,575 B1 * | 4/2002 | Kaser | E05F 3/227 | 16/48.5 |
| 7,670,216 B2 * | 3/2010 | Chilelli | E05F 3/227 | 454/195 |

(Continued)

FOREIGN PATENT DOCUMENTS

| | | |
|---|---|---|
| EP | 3064684 A1 | 9/2016 |
| GB | 2307712 A | 6/1997 |
| KR | 20210155752 A * | 12/2021 |

*Primary Examiner* — Jeffrey O'Brien
(74) *Attorney, Agent, or Firm* — CANTOR COLBURN LLP

(57) ABSTRACT

A backplate for a door actuator includes at least one first mounting element and a second mounting element, wherein one of the two mounting elements is formed for fastening to a mounting surface, in particular door, casing or wall, and the other mounting element is formed for receiving the door actuator. The backplate also includes, at least one connecting assembly, which in a retaining position, keeps the two mounting elements together and, in a release position, does not keep the two mounting elements together, and at least one shape memory assembly with a shape memory element made from shape memory material, wherein, upon thermal activation, the shape memory assembly moves the connecting assembly to the release position.

20 Claims, 21 Drawing Sheets

(56) References Cited

U.S. PATENT DOCUMENTS

| | | | | |
|---|---|---|---|---|
| 7,698,796 | B1 * | 4/2010 | Dowling | E05F 3/227 29/402.08 |
| 8,756,759 | B2 * | 6/2014 | Kaestle | E05F 3/22 16/49 |
| 10,975,595 | B2 * | 4/2021 | Hickman | E05B 17/0075 |
| 11,725,445 | B2 * | 8/2023 | Hellwig | E05F 3/227 16/49 |
| 11,814,888 | B2 * | 11/2023 | Hellwig | E05F 1/006 |
| 2004/0098940 | A1 * | 5/2004 | Latessa | E06B 7/00 52/514 |
| 2014/0260929 | A1 * | 9/2014 | Leites | E05B 17/0075 89/1.14 |
| 2021/0388657 | A1 * | 12/2021 | Hellwig | E05F 3/227 |
| 2023/0027773 | A1 * | 1/2023 | Hellwig | F16B 4/008 |

* cited by examiner

A - A

B - B

E - E

BACKPLATE FOR A DOOR ACTUATOR

CROSS REFERENCE TO RELATED APPLICATIONS

This application is related to and claims the benefit of European Patent Application No. 20213875.6, filed on Dec. 14, 2020, the contents of which are herein incorporated by reference in their entirety.

TECHNICAL FIELD

The disclosure relates to a backplate for a door actuator.

BACKGROUND

Door actuators are used for closing and/or opening doors. In particular, door closers and door drives are designated as door actuators. Generally, in a door closer, the manual opening movement charges a spring accumulator. Thereby, the stored energy is used for closing the door. For example, in the door drive, electro-mechanics or hydraulics allow for automatically open and/or close the door. Usually, door actuators are fastened to the door leaf or to the casing, respectively the wall. Most of the time, mounting plates are used for fastening the door actuators. The mounting plate is fastened to the mounting surface thereof, namely the door, casing or wall. In turn the door actuator is attached to the mounting plate.

In particular, with fire-rated doors, it should be noted that often combustible fluids, in particular hydraulic oils, are used in the door actuators. In the event of a fire, as much as possible, suitable measures should allow for preventing the fluid in the door actuator from heating up too much and potentially from igniting after escaping from the door actuator.

SUMMARY

The present disclosure provides a backplate for a door actuator, which fulfils dependable fastening of the door actuator and simultaneously safety relevant requirements, in particular in the event of a fire.

The disclosure achieves the advantages with the features of the independent claim. Advantageous further configurations of the disclosure are the subject matter of the dependent claims.

The disclosure describes a backplate, which is used instead of a conventional mounting plate for fastening the door actuator. The backplate includes at least one first mounting element and a second mounting element. The mounting elements are connected to each other via at least one connecting assembly. Under corresponding thermal load, said connecting assembly loosens so that the two mounting elements separate from each other. Thereby, the door actuator detaches from the mounting surface, namely from the door, casing or wall. In particular in this case, it is assumed that the door actuator is located on the side of the door facing away from the fire. The door actuator detaching from the mounting surface thereof, prevents the door actuator from heating up too much, whereby the fluid is prevented from escaping from the door actuator and the fluid is prevented from igniting.

For describing directions, a mounting axis is defined at the backplate. The mounting axis is parallel to the screws, for example, which are used for screwing the backplate to the mounting surface. According to an alternative definition, the mounting axis is perpendicular to the output axis of the door actuator. Perpendicular to the mounting axis are defined a longitudinal axis and a vertical axis; in usual mounting situation, the longitudinal axis extends horizontally.

Preferably, the two mounting elements are plates or plate-shaped elements, which, for forming the backplate, are disposed next to each other or in particular one within the other. In particular, it is provided the at least one first mounting element with the backside thereof is fastened, in particular screwed, to the mounting surface. A door, casing or wall forms said mounting surface. Accordingly, the second mounting element is connected to the door actuator. In particular, the second mounting element has a front surface, to which the door actuator is fastened, in particular screwed. Preferably, the second mounting element is a self-contained component, to which the door actuator is fastened. However, as an alternative, the second mounting element can be an integral component of the door actuator.

Furthermore, also the inverse embodiment is possible, whereby the at least one first mounting element is formed for accommodating the door actuator and the second mounting element is fastened to the mounting surface.

The backplate comprises at least one connecting assembly. In particular, are provided one, two, three, four, five or more such connecting assemblies.

The connecting assembly, in the retaining position thereof, keeps the two mounting elements together. In particular, this is realized by means of a form closure in the connecting assembly. The connecting assembly is movable to a release position. In said release position, the connecting assembly does not keep the two mounting elements together anymore; in particular, the connecting assembly releases the positive connection realized among the two mounting elements.

Furthermore, the backplate comprises at least one shape memory assembly. Again, said shape memory assembly comprises at least one shape memory element (e.g. wire), which is made from shape memory material. In particular, said shape memory material is shape memory metal or shape memory alloy. In particular, the shape memory material is specific metal, which may exist in two different crystal structures (e.g. austenite and martensite). The shape memory assembly is disposed and formed in the backplate so as, when thermally activated, to move the connecting assembly to the release position. Namely in the backplate, the shape memory assembly is used as an actuator or drive for moving the connecting assembly. In this case, it is not the entire connecting assembly that needs to be moved, but it can be sufficient if a part of the connecting assembly is moved for loosening the connection between the two mounting elements.

Thermally activating is realized in particular in a temperature range of 90° C. to 200° C. In particular in this case, the shape memory assembly is formed in that activation occurs at a corresponding temperature, which is suitable for preventing the fluid from escaping from the door actuator and preventing the fluid from following ignition. In particular, thermally activating means heating the shape memory element so the martensitic structure converts to the austenitic structure.

Preferably, the shape memory element is formed as wire, rod or spring. In particular, the spring is a spiral spring. When thermally activated, the shape memory element changes the length thereof; in particular it shortens. Thereby, by thermally activating the shape memory element, a force, in particular a tensile force, can be exerted on an element of the connecting assembly. Thus, the force, in particular the tensile force, can be used for releasing the connections of the connecting assembly.

In the backplate, preferably at least partially, the shape memory element is disposed in a receiving groove and/or in a completely closed channel. In particular, the receiving groove or the channel is located in the first mounting element. Said arrangement in the receiving groove or the channel allows for a protected position of the relatively thin shape memory element so as to not damaging the wire when mounting the backplate, for example. Preferably, the receiving groove or the channel extends over at least 50% of the length of the shape memory element. Furthermore hereby, it is achieved that the heat transport from the mounting surface to the shape memory element is particularly quick and thus the backplate is able to react as quickly as possible to a dangerous temperature increase of the mounting surface.

Preferably, the first mounting element comprises a baseplate, which in particular is provided for resting at the mounting surface. In particular, the baseplate is screwed to the mounting surface via corresponding fastening holes.

Preferably, the second mounting element is formed as a plate. In particular, said plate includes at least one receiving recess. In particular, the receiving recess is continuous from the front side as far as to the backside. The first mounting element is disposed in the receiving recess. In particular, the second mounting element is frame-shaped and thus completely surrounds the at least one receiving recess.

Also several receiving recesses can be provided in the second mounting element, respectively for disposing a first mounting element.

With this embodiment, the at least one first mounting element is incorporated into the plate-shaped second mounting element and provides for a space-optimized structural construction.

Preferably, the backplate has a maximum thickness of 6 mm, in particular of a maximum of 4 mm. Said relatively thin embodiment results in an appearance just like a normal mounting plate. In particular, the thickness is measured from the backside to the front side, namely parallel to the mounting axis. Potential positioning extensions or other elements, on which the door actuator is fitted, remain disregarded.

In this preferred embodiment, it is provided for the connecting assembly to comprise at least one bar element. Said bar element is disposed mobile at the first mounting element and can be moved from the retaining position thereof to a release position. In particular, the first mounting element is the component to be screwed to the mounting surface (door, wall or casing).

In the default condition, namely when the shape memory assembly is not thermally activated, the bar element is in the retaining position thereof and, in this case, retains the second mounting element. In the release position, the bar element releases the second mounting element, such that the two mounting elements can detach from each other. Thereby, the door actuator also detaches from the mounting surface.

The movement of the bar element to the release position thereof is realized by the shape memory assembly, which, upon thermal activation, exerts a corresponding force on the bar element of the connecting assembly.

The connection between the shape memory assembly, in particular the shape memory element, and the at least one bar can be direct or indirect. Also, the positive connection between the bar element and the second mounting element can be direct or indirect. For example, a variant is presented, in which a swivel bar is disposed between the bar element and the second mounting element, which swivel bar the bar element initially blocks and which is able to rotate in the release position for thus releasing the form closure to the second mounting element.

Basically, the shape memory assembly is disposed and formed for moving the bar element. The bar element can be disposed linearly mobile or rotationally mobile at the first mounting element, in particular at the baseplate of the first mounting element. In this case, the bar element is either linearly mobile parallel to the longitudinal axis or parallel to the vertical axis and thus perpendicularly to the mounting axis. In the rotationally mobile arrangement, it is in particular provided the corresponding bar axis of rotation is parallel to the mounting axis.

According to said different arrangements of the bar element, the shape memory assembly is disposed and formed, in particular, for pulling, rotating or deforming the bar element. In this case, deforming can go hand in hand with a pulling and/or rotating movement of the bar element.

Preferably, it is provided that the backplate includes at least two counter-directional bar elements. In particular, the two bar elements are counter-directional in that, when moving, they are moved towards each other, in particular parallel to the longitudinal axis, to the release position thereof. In this case preferably, the two ends of the at least one shape memory assembly are connected to the two counter-directional bar elements so that, upon thermal activation, the shape memory assembly contracts and thereby simultaneously moves the two bar elements towards each other to the release position.

As an alternative, it is also possible for coupling the two counter-directional bar elements to one respective shape memory assembly. In particular, then one end of the shape memory assembly is connected to the associated bar element and the other end of the shape memory assembly is connected to the first mounting element, in particular the baseplate. Upon thermal activation, the shape memory assemblies contract again and thereby pull the associated bar element to the desired release position.

In a third variant, at least two synchronous bar elements are provided, wherein the two synchronous bar elements together with a shape memory assembly, in particular a shape memory element, are force-transmitting connected. Thereby, upon thermal activation, the one shape memory assembly is able to simultaneously move both elements. In this case, it is provided in particular the shape memory assembly being fastened with one end to the first mounting element, in particular the baseplate, and the other end of the shape memory assembly is connected to one of the two bar elements. Force transmission to the further bar element can be realized via an element for force transmission, for example a bushing. In this case preferably, the shape memory element extends through the bushing.

Particularly preferred, it is provided that an end piece is disposed at least at one end, preferably at both ends of the respective shape memory element. In particular, said end piece is an element crimped to the shape memory element. With such end pieces, the shape memory assembly is connected to the associated bar element and/or to the baseplate of the first mounting element, for example by hooking to a corresponding receiving fork. As an alternative, the shape memory element can be connected to the corresponding element of the device by clamping or directly by material connection (e.g. laser welding point).

For improving the sliding movement between bar element and first or second mounting element, preferably at least one rolling body is provided. Such rolling body is located between the bar element and the first mounting element and/or between bar element and second mounting element.

Preferably, the rolling body is a cylinder (for example a rod) or a sphere. Such rolling bodies can be inserted in one of the mounting elements or the bar element without complicated attachment.

As explained, the bar element can be supported linearly mobile at the first mounting element. In particular in this case, it is provided for the bar element to include at least one guide. In particular, said guide is an oblong guide hole or a guide groove. From the first mounting element, a guide extension protrudes into the guide for thus guaranteeing the linear mobile guiding of the bar element with regard to the first mounting element. The guide extension can be an integral component of the baseplate of the first mounting element or for example a screw, which is inserted into the baseplate.

Furthermore preferably, it is intended that a swivel bar is disposed between the bar element and the second mounting element. In particular, the swivel bar is rotationally mobile supported at the first mounting element. Preferably, the swivel axis is perpendicular to the mounting axis; in particular parallel to the longitudinal axis or parallel to the vertical axis.

In particular, the swivel bar comprises two branches, wherein the swivel bar axis of rotation is disposed between the two branches. The one branch of the swivel bar rests positively directly or indirectly at the second mounting element. The other branch rests positively directly or indirectly at the bar element in the retaining position thereof.

As long as the bar element is in the retaining position thereof, the swivel bar is prevented from rotating about the swivel bar axis and the positive connection to the second mounting element remains is kept.

A transverse element, in particular in the shape of a rod-shaped rolling body, can be disposed between the bar element and the swivel bar. When moving the bar element to the release position, said transverse element is pulled out underneath the branch of the swivel bar.

Furthermore, as already explained, it is intended that the bar element is supported rotationally mobile at the first mounting element. In this case, the shape memory assembly can be connected directly or indirectly to the bar element for rotating the bar element about the bar element axis of rotation thereof.

In particular, a transfer rod is provided, which the shape memory assembly pulls upon thermal activation. Preferably, the transfer rod is disposed linearly mobile parallel to the longitudinal axis.

Again, the transfer rod is connected in such a way to the at least one rotatable bar element so that the linear movement of the transfer rod is converted to a rotary movement of the at least one bar element.

In the rotatable embodiment, in the retaining position the bar element is positively connected to the second mounting element and formed so as to being preferably released during a rotation of less than 360°, preferably of less than 180°. In particular for this purpose, the bar element has a cam or otherwise eccentric arrangement, which extends perpendicularly to the bar axis of rotation and engages in the positive connection with the second mounting element.

Particularly preferred, at least at one area of the circumference, the rotatable bar element includes a conical surface, which cooperates with a complementary conical surface of the second mounting element so that, upon a rotation to the release position, the two cooperating conical surfaces push the second mounting element away from the mounting surface so that the door actuator moves away from the mounting surface.

Furthermore preferably, it is intended that the shape memory assembly is disposed and formed for deforming the at least one bar element. In this case, the bar element is in particular deformed so that the positive connection is loosened between bar element and second mounting element.

In particular, the deformable bar element has a U-shape or V-shape with two converging branches, Preferably, the shape memory assembly pulls on the bar assembly centrally between said two branches so that, for loosening the connection, the two branches move towards each other or away from each other.

In particular in the embodiments with linearly mobile bar element, it is intended that an inclined plane is formed between bar element and first mounting element and, when moving to the release position, the bar element moves over said inclined plane whereby the bar element moves perpendicularly to the mounting surface and thus is able to exert pressure force onto the door actuator. In this case, the bar element can either push away the second mounting element or directly the door actuator. Thereby assisting in detaching the door actuator.

In alternative embodiments without bar element, preferably it is intended that the connecting assembly comprises at least one form closure assembly between the two mounting elements. In particular, said form closure assembly comprises form closure elements directly connected to the first and second mounting elements or integrally formed therewith, which, in the retaining position, positively engage in each other. By moving at least one of the two mounting elements by means of the shape memory assembly, said form closure elements of the form closure assembly can be moved in relation to each other, whereby the loosening the connection between the mounting elements.

According to a first variant, upon thermal activation by the shape memory assembly, the second mounting element is displaceable in relation to the first mounting element to the release position, whereby the form closure elements of the form closure assembly detach from each other.

According to a second variant, it is intended that the form closure assembly is disposed and formed for deforming at least one of the two mounting elements, in particular of the first mounting element. In this case, the corresponding mounting element is deformable so that the form closure assembly loosens between the two mounting elements.

In case deforming the first mounting element is intended, the first mounting element is screwed to the mounting surface preferably via oblong holes, so that the first mounting element is able to move in relation to the screws via said oblong holes.

Independently of the configuration of the connecting assembly, preferably it is intended that the backplate comprises at least one detaching element. The detaching element is thermally intumescent material, for example a swell pad or a corresponding spring. The detaching element is disposed such that it pushes the door actuator away from the mounting surface. In this case, the detaching element can act directly onto the door actuator or onto the corresponding mounting element.

Furthermore, the backplate can include a thermally activatable blocking element. For example, the blocking element is made from thermally intumescent material or is a glass vial filled with fluid, such as known from sprinkler systems. Furthermore, the blocking element can be made as well from any other material, which melts or deforms at a corresponding temperature.

The blocking element is disposed such that it blocks a movement of the connecting assembly to the release position. Only upon thermal activation, at best before activating the shape memory assembly, the blocking element detaches and thereby releases the movement of the connecting assembly.

Furthermore, the disclosure comprises an assembly, comprising the described backplate and a door actuator. In this case, in particular the door actuator is fastened to the second mounting element. Preferably, the backplate is fastened to a mounting surface, in particular door, casing or wall.

BRIEF DESCRIPTION OF THE DRAWINGS

The disclosure is now described in more detail based on exemplary embodiments. In this case, it shows.

DETAILED DESCRIPTION OF THE DRAWINGS

Figure 1:
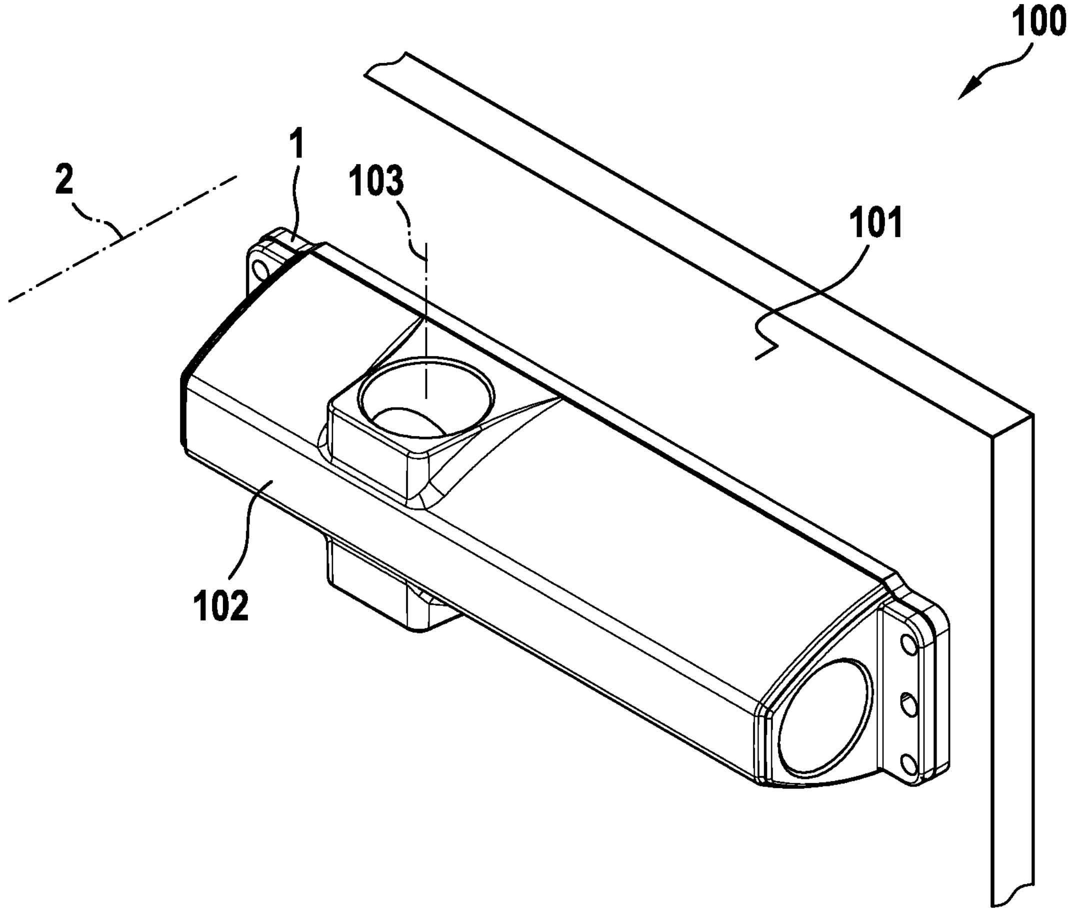
FIG. 1 an inventive assembly with inventive backplate according to all exemplary embodiments, FIG. 2 the inventive backplate according to a first exemplary embodiment, FIG. 3 the section A-A identified in FIG. 2, FIGS. 4 to 6 different details of the inventive backplate according to the first exemplary embodiment, FIG. 7 the inventive backplate according to a second exemplary embodiment.
Figure 2:
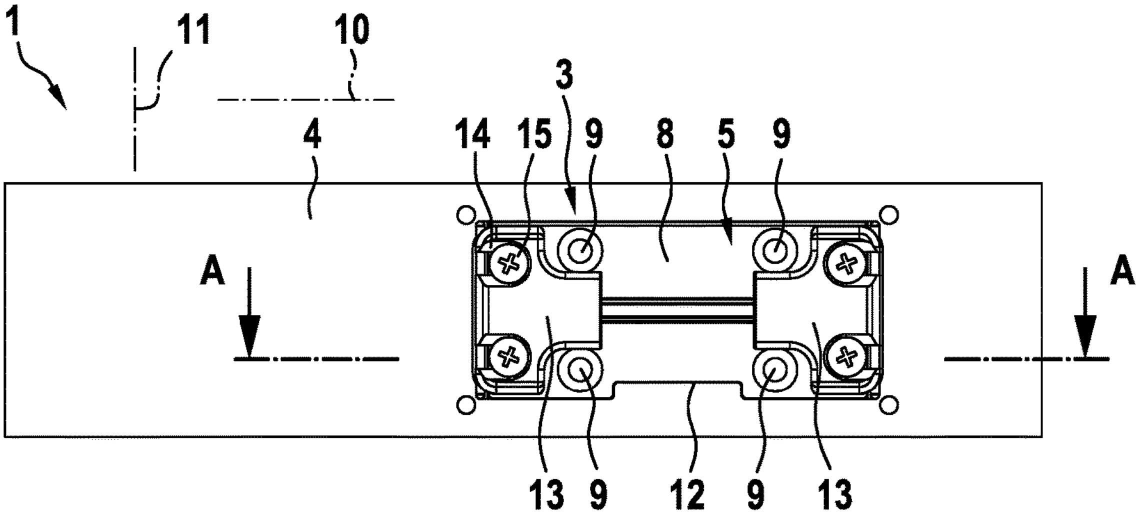

In the following, an assembly 100 as well as a backplate 1 are described in detail based on the Figures. FIG. 1 shows purely diagrammatically a mounting surface 101 of the assembly 100 for all exemplary embodiments. A door, casing or wall forms said mounting surface 101, for example. A mounting axis 2 is defined perpendicularly to the mounting surface 101. A longitudinal axis 10 is defined perpendicularly to the mounting axis 2 and horizontally. A vertical axis 11 is defined perpendicularly to the longitudinal axis 10 and perpendicularly to the mounting axis 2. The longitudinal axis 10 and the vertical axis 11 are illustrated in FIG. 2, for example. The door actuator 102 is mounted on the backplate 1. The door actuator 102, herein formed as a door closer, includes an output axis 103. The output axis 103 is perpendicular to the mounting axis 2 and parallel to the vertical axis 11.

In all exemplary embodiments, the backplate includes a first mounting element 3 and a second mounting element 4. The first mounting element 3 is inserted into a recess 12 of the plate-shaped and frame-shaped second mounting element 4.

In this case in particular, it is intended that, seen from the thickness, namely parallel to the mounting axis 2, the first mounting element 3 does not extend considerably further than the second mounting element 4. Thus, the entire thickness 43 of the backplate 1 is determined by the thickness of the second mounting element 4.

The backplate 1 has a backside 6, which is to face the mounting surface 101. A front side 7, to which the door actuator 102 is placed, is defined on the opposite side. In particular, on said front side 7, the door actuator 102 is fastened, in particular screwed, to the second mounting element 4. However, the second mounting element 4 can be an integral component of the door actuator 102, and thus form the backside of the door actuator 102.

In the exemplary embodiments, the first mounting element 3 has at least one base plate 6. Essentially, the base plate 8 extends in the plane spanned by the longitudinal axis 10 and vertical axis 11. Fastening holes 9 are provided in the base plate 11 for fastening the base plate 8 to the mounting surface 101. In particular, said fastening holes 9 are countersunk at the front side 7 so that the screw heads can be inserted flush.

All the exemplary embodiments have one or more shape memory assemblies 20. The respective shape memory assembly comprises at least one shape memory element 21, which herein is respectively formed as shape memory wire from a corresponding shape memory metal alloy.

The shape memory element 21 can have end pieces 22 at one end or both ends. In particular, said end pieces 22 are thicker area, for example elements crimped onto the wire.

The backplate 1 comprises one respective connecting assembly 5 for positively connecting the two mounting elements 3, 4. The shape memory assemblies 20 allow for moving the connecting assembly 5 from the retaining position to the release position.

In the following are explained details of the different exemplary embodiments. Same, respectively functionally same or similar structural components are always identified with the same reference signs. Unless otherwise stated, reference is always made to all the Figures of the respective exemplary embodiment.

FIGS. 2 to 6 show the first exemplary embodiment: Herein the connecting assembly 5 comprises two bar elements 13. From the illustrated retaining position to the release position thereof, the two bar elements 13 are movable counter-directional towards each other. Parallel to the longitudinal axis 10 guides 14 are provided for the linear mobility of the two bar elements 13. Herein, the guides 14 are formed by oblong holes, open to one side, in the bar elements 13.

One respective guide extension 15, herein formed by a screw and projecting from the base plate 8, protrudes into said guides 14. Simultaneously, with the heads thereof, said guide extensions 15 serve for fastening the bar elements 13 on the base plate 8.

Figure 3:
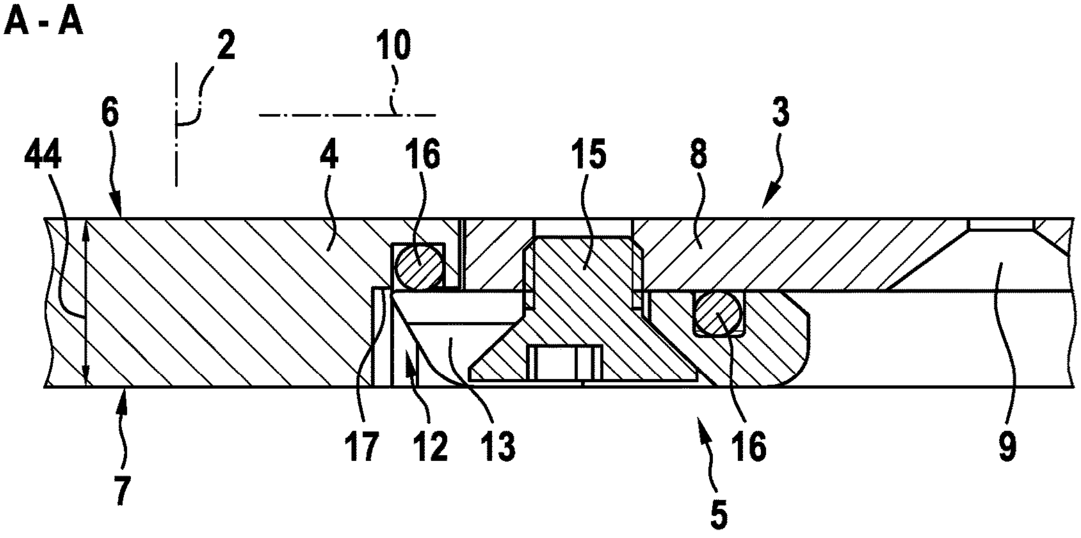

As in particular shown in section A-A in FIG. 3, the second mounting element 4 has a shoulder 17 in the receiving recess 12. The associated bar element 13 engages in a positive connection with said shoulder 17 so that, in the retaining position shown, the second mounting element 4 cannot detach from the first mounting element 3. By pulling on both bar elements 13, in the exemplary embodiment 1 shown by the two bar elements 13 moving towards each other, the connecting assembly 5 loosens, and the second mounting element 4 can be moved away from the mounting surface 101.

Rolling bodies 16, herein in the shape of rods, are inserted for improving the sliding movement of the respective bar element 13. The one rolling body 16 is inserted at the shoulder 17 into a groove of the second mounting element 4. Another rolling body 16 is inserted into the bar element 13 and is in rolling contact with the front side 7 of the base plate 8.

In the first exemplary embodiment are provided two shape memory assemblies 20. Each shape memory assembly 20 has a shape memory element 21. Respective end pieces 22 are disposed at both ends of the respective shape memory element 21.

Two parallel receiving grooves 23 are provided in the base plate 8. The shape memory elements 21 extend through said receiving grooves 23. On both sides, the receiving grooves 23 lead into the base plate recesses 25. The end pieces 22 find space in said base plate recesses 25.

Figure 4:
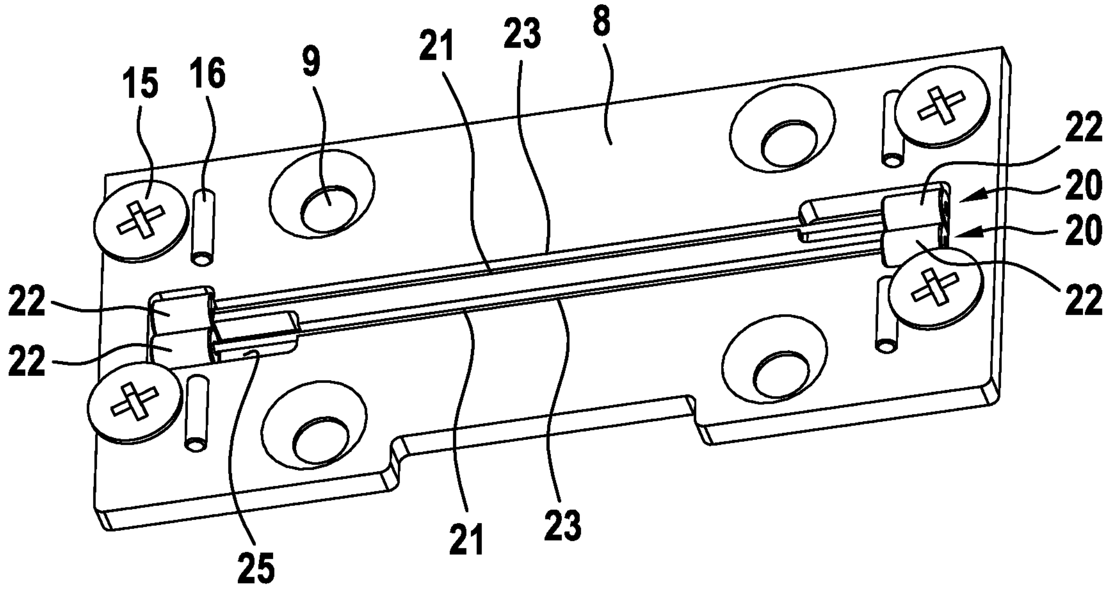
Figure 5:
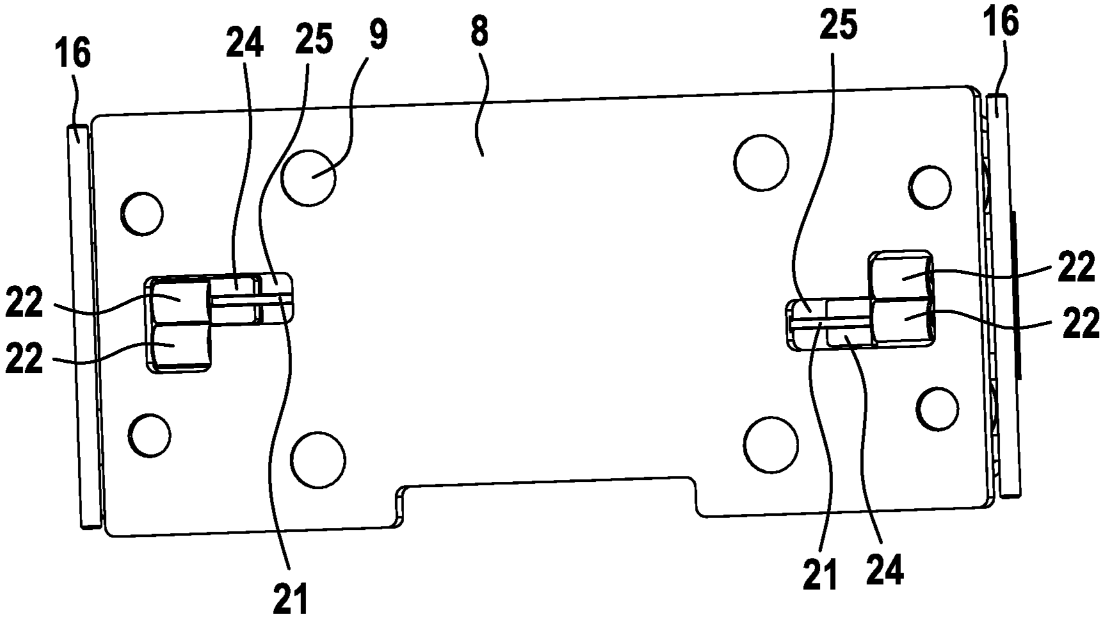
Figure 6:
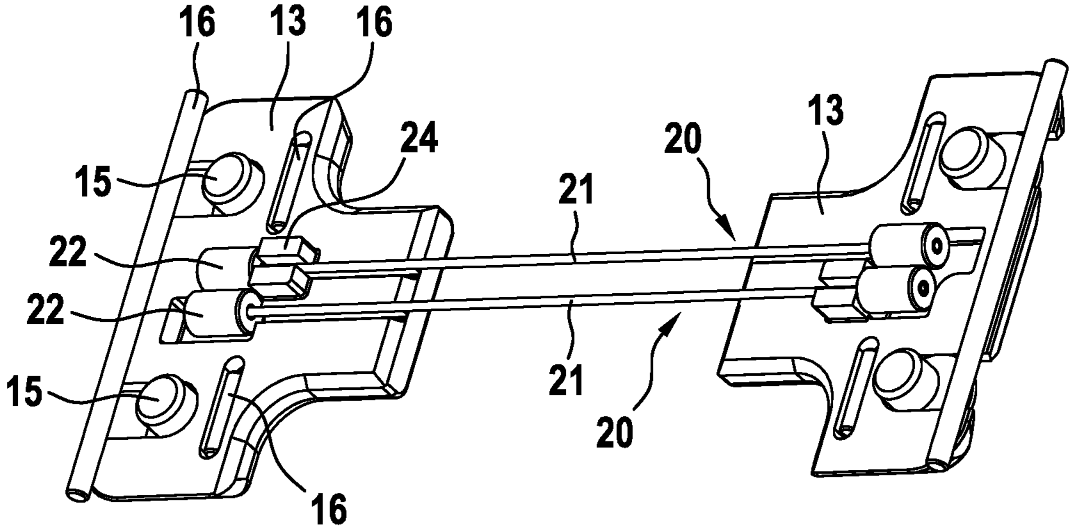

As revealed in the combined view of the FIGS. 4, 5 and 6, with one end piece 22, the respective shape memory element 21 rests in the base plate recess 25 at the base plate 8 and, with the opposite end piece 22, at the associated bar element 13. Upon thermal activation, the length of the shape memory element 21 shortens, whereby the bar element 13 is pulled.

As a connection between shape memory element 21 or end piece 22 and bar element 13, the respective bar element 13 has a receiving fork 24, into which the shape memory element 21 is to be inserted, and at which rests the end piece 22.

For a more space saving design, the base plate recess 25 is formed so that the receiving fork 24 of the bar element 13 can protrude into the base plate recess 25 and can move in the base plate recess 25; as illustrated in FIG. 5.

FIGS. 7 to 12 show the second exemplary embodiment in different variants.

Just like the first exemplary embodiment, the second exemplary embodiment shows counter-directional bar elements 13, which, with the shape memory assemblies 20, can be moved towards each other for thus loosening the form closure to the second mounting element 4.

Figure 7:
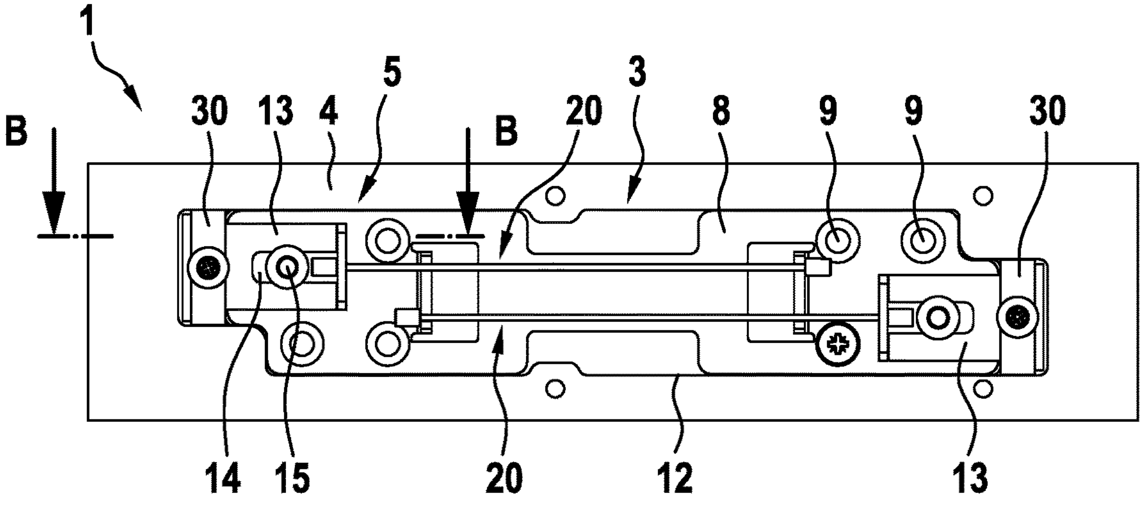
Figure 8:
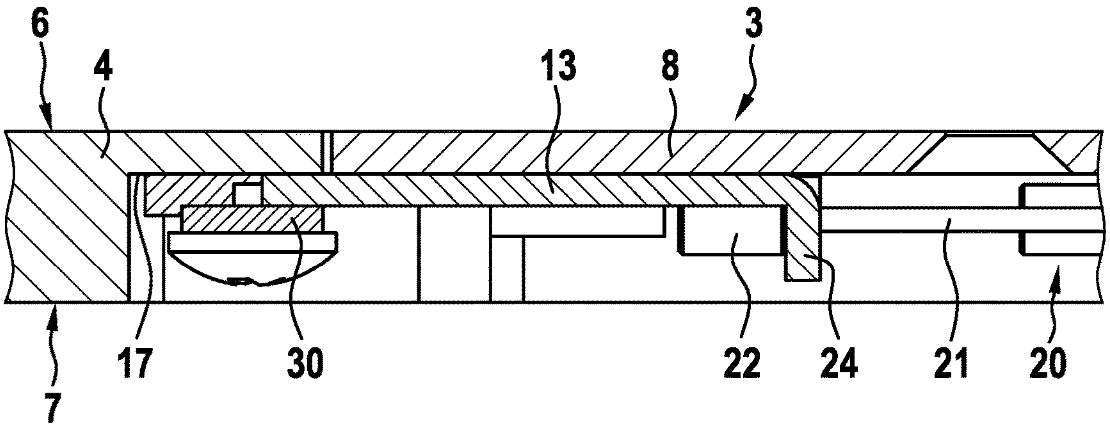
FIG. 8 the section B-B identified in FIG. 7.
Figure 9:
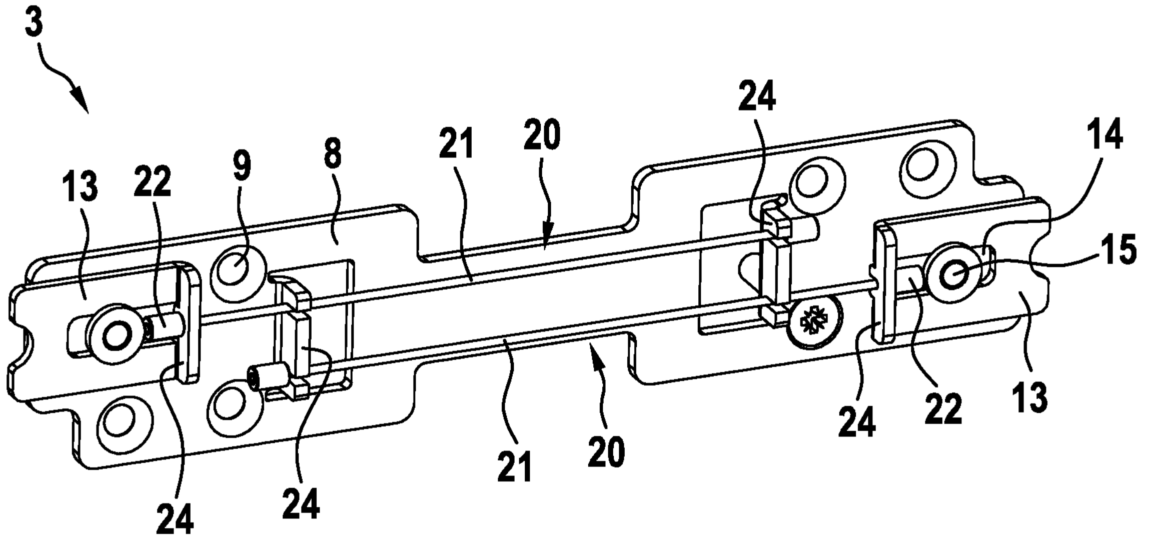
FIG. 9 a detail of the inventive backplate according to the second exemplary embodiment.

FIGS. 7, 8 and 9 show a construction of the first mounting element 3, in particular of the base plate 8 and the two bar elements 13 made from bent sheet-metal. Herein again, like in the first exemplary embodiment, the bar elements 13 are guided linearly mobile at the base plate 8 via corresponding guide extensions 15 and guides 14.

A bridge 30, which is screwed to the second mounting element 4, is located at the shoulder 17 in the receiving recess 12. Between said bridge 30 and the shoulder 17, the associated bar element 13 extends to the retaining position.

Figure 10:
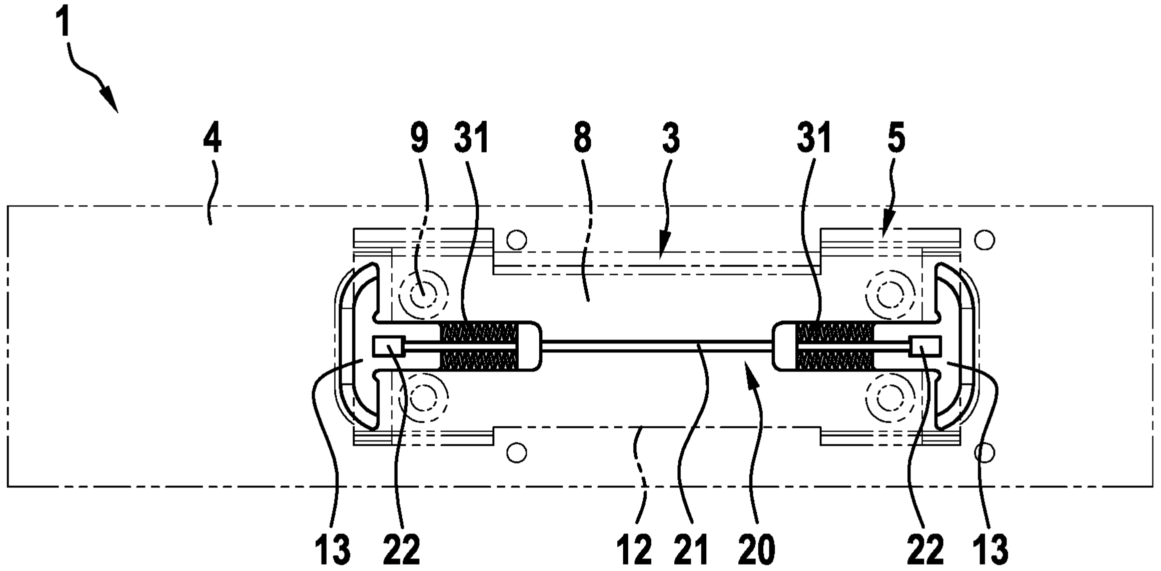
FIGS. 10 & 11 a first variant of the inventive backplate according to the second exemplary embodiment, FIG. 12 a second variant of the inventive backplate according to the second exemplary embodiment, FIG. 13 the inventive backplate according to a third exemplary embodiment.
Figure 11:
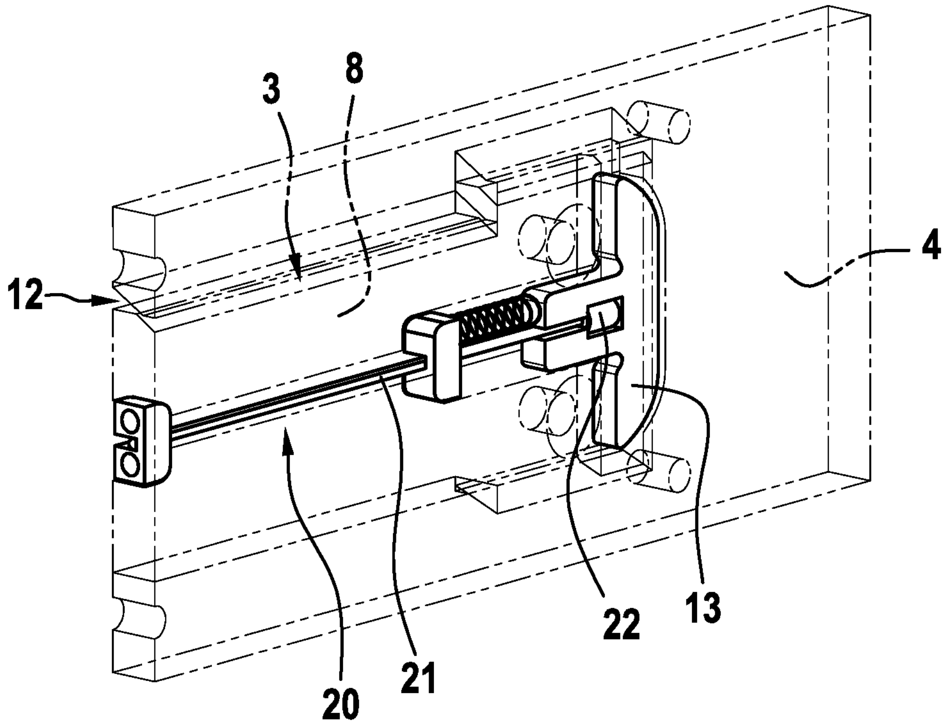

FIG. 10 and the associated detail in FIG. 11 show a variant of the second exemplary embodiment. Herein are provided two counter-directional bar elements 13. In this case, the bar elements are charged with play compensating springs 31 in the retaining position thereof, so that a play-free connection is given between the two mounting elements 3, 4. Such a play compensating spring 31 can be employed in all shown exemplary embodiments, in particular in the exemplary embodiments with at least one bar element 13. Furthermore herein, a cone, which guarantees a play-free position of the bar element 13 in the second mounting element 4, can be provided between the bar element 13 and the associated surface at the second mounting element 4.

Figure 12:
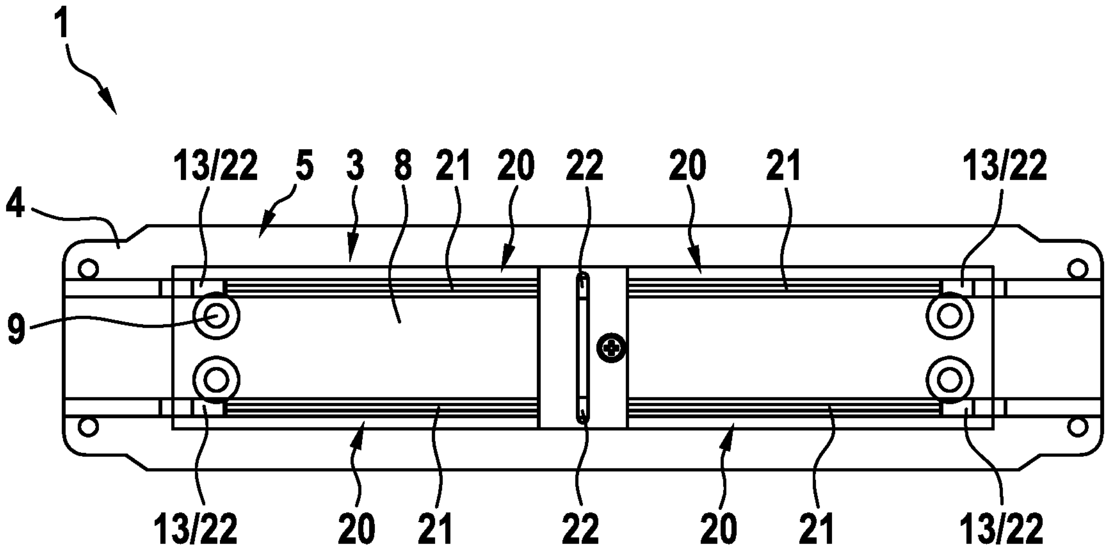

FIG. 12 shows a further variant to the second exemplary embodiment. Herein, four bar elements 13 are provided, which respectively are formed by the end pieces 22 thereof of the shape memory element 21.

Herein, in detail are provided four shape memory assembles 20. The four shape memory elements 21, with the centrally located end pieces 22 thereof, are connected to the base plate 8 in the centre of the backplate 1. On the outsides, in corresponding receiving grooves 23 or channels, the end pieces 22 in the retaining position protrude simultaneously into the first mounting element 3 and the second mounting element 4. Thereby, realizing a positive connection between the two mounting elements 3, 4. Upon thermal activation, the four shape memory elements 21 contract, whereby the end pieces 22, which are located on the outside, are pulled out of the second mounting element 4.

Figure 13:
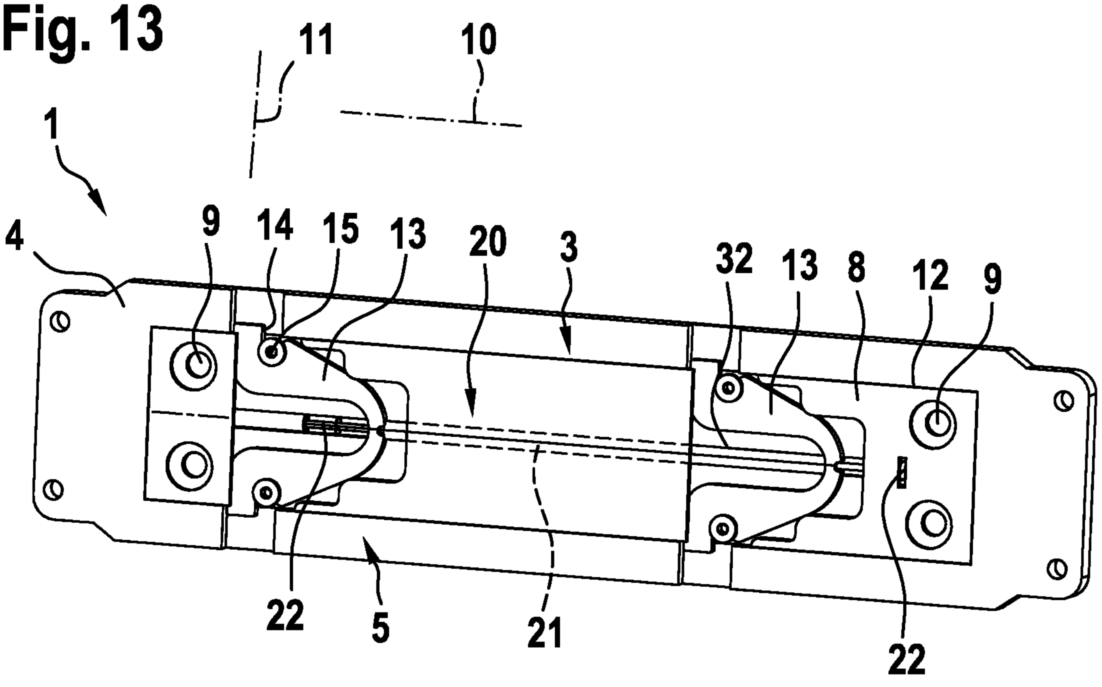
Figure 14:
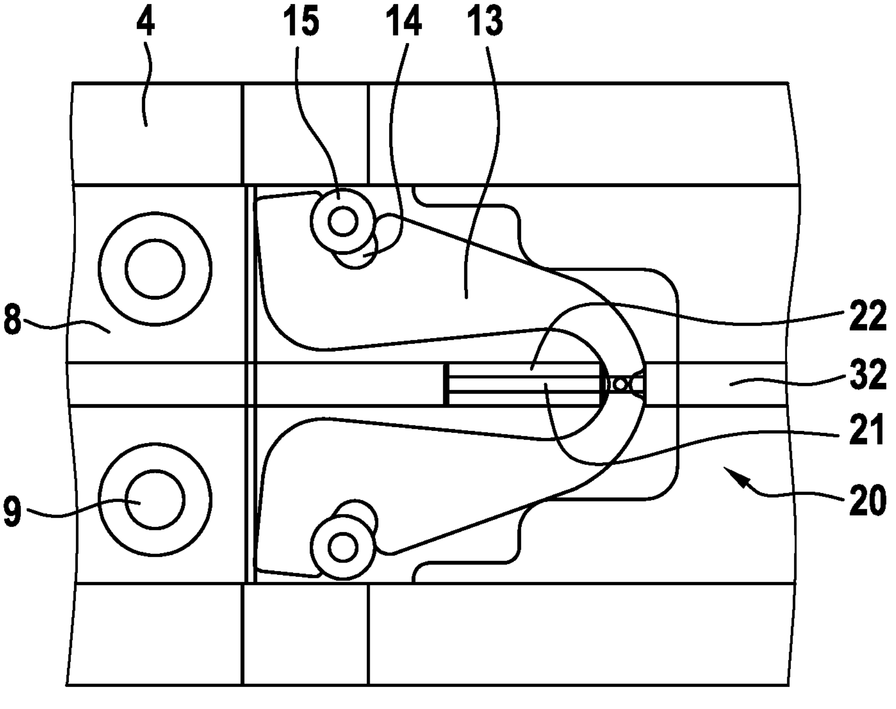
FIG. 14 a detail to FIG. 13.
Figure 15:
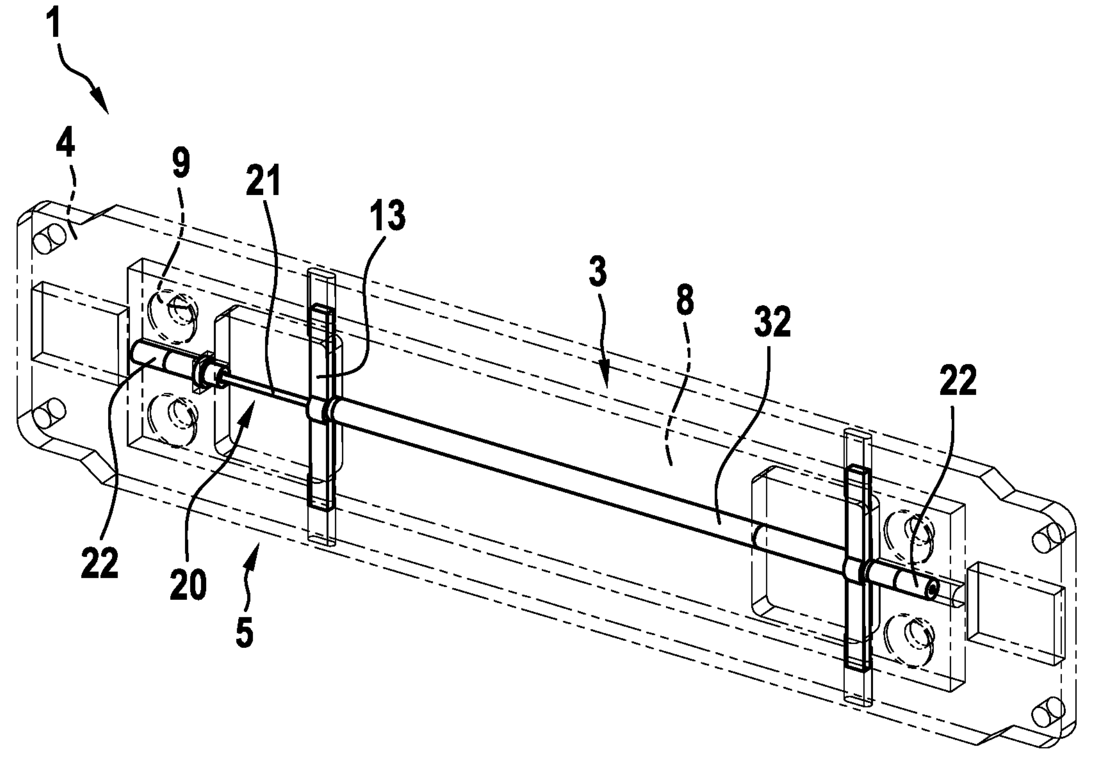
FIG. 15 a variant of the inventive backplate according to the third exemplary embodiment, FIG. 16 a front side of the inventive backplate according to a fourth exemplary embodiment, FIG. 17 a backside of the inventive backplate according to the fourth exemplary embodiment, FIG. 18 details of the inventive backplate according to the fourth exemplary embodiment, FIG. 19 a variant of the inventive backplate according to the fourth exemplary embodiment, FIG. 20 a front side of the inventive backplate according to the fifth exemplary embodiment, FIG. 21 a detail of the inventive backplate according to the fifth exemplary embodiment, FIG. 22 the section E-E identified in FIG. 20, FIG. 23 a first variant of the inventive backplate according to the fifth exemplary embodiment, FIG. 24 a second variant of the inventive backplate according to the fifth exemplary embodiment, FIG. 25 a third variant of the inventive backplate according to the fifth exemplary embodiment, FIG. 26 the inventive backplate according to a sixth exemplary embodiment in retaining position, FIG. 27 the inventive backplate according to the sixth exemplary embodiment in release position, FIG. 28 a detail of the inventive backplate according to the sixth exemplary embodiment, FIG. 29 the inventive backplate according to a seventh exemplary embodiment, FIG. 30 the inventive backplate according to an eighth exemplary embodiment, FIG. 31 a detail of the inventive backplate according to all exemplary embodiments, and FIG. 32 a detail of the inventive backplate according to all exemplary embodiments.

FIGS. 13 to 15 show the third exemplary embodiment in different variants: In the third exemplary embodiment, the bar elements 13 are both linearly mobile and deformable. Said deforming of the respective bar elements 13 makes the bar elements 13 detach from the second mounting element 4 and thus loosen the connecting assembly 5.

Furthermore, the third exemplary embodiment reveals how only one shape memory assembly 20 and thus only one shape memory element 21 can rectify and simultaneously move several bar elements 13.

FIG. 13 shows two U-shaped configured bar elements 13; in particular as flat sheet-metal parts. The respective bar element 13 has two branches, which, with the ends thereof, positively engage into the second mounting element 4. In the illustration shown according to FIG. 13, upon thermal activation, the shape memory assembly 20 can pull the bar elements 13 to the right, whereby the branches move inwards. Thereby causing the bar elements 13 to deform. For promoting said inward movement of the branches, herein, the guides 14 and the associated guide extensions 15 are correspondingly disposed. The diagrammatic illustration in FIG. 14 clarifies the movement to the release position and thus the deformation of the bar element 13.

Independently of the given exemplary embodiment, FIGS. 13 and 14 explain that a shape memory element 21 can move both bar elements 13. In the illustration of FIG. 13, with the right end piece 22, the shape memory element 21 is fastened to the base plate 8. The shape memory element 21 extends parallel to the longitudinal axis 10 through the right bar element 13 or past the right bar element 13 as far as to the left bar element 13. With the left end piece 22, the shape memory element 21 is connected to the left bar element 13 and thus can pull the left bar element 13. A bushing 32 is provided for transferring force onto the right bar element 13. The wire-shaped shape memory element 21 passes through said bushing 32. The bushing 32 rests at the two bar elements 13 and thus, can transmit the force from the left bar element 13 to the right bar element 13.

FIG. 15 explains a variant, in which the two bar elements 13 are not formed U-shaped with two branches, but the bar element 13 as a bendable part, for example sheet metal part, extends parallel to the vertical axis 11 and thereby, at the top and at the bottom, protrudes into the second mounting element 4. Herein again, pulling only one shape memory element 21 can achieve bending both bar elements 13, whereby the connecting assembly 5 is able to loosen.

Figure 16:
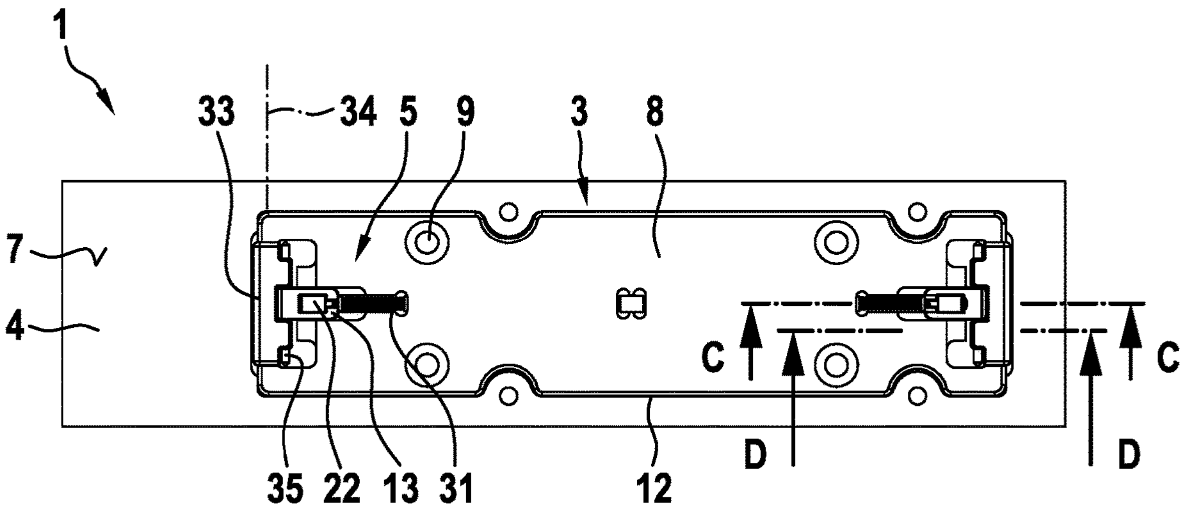
Figure 17:
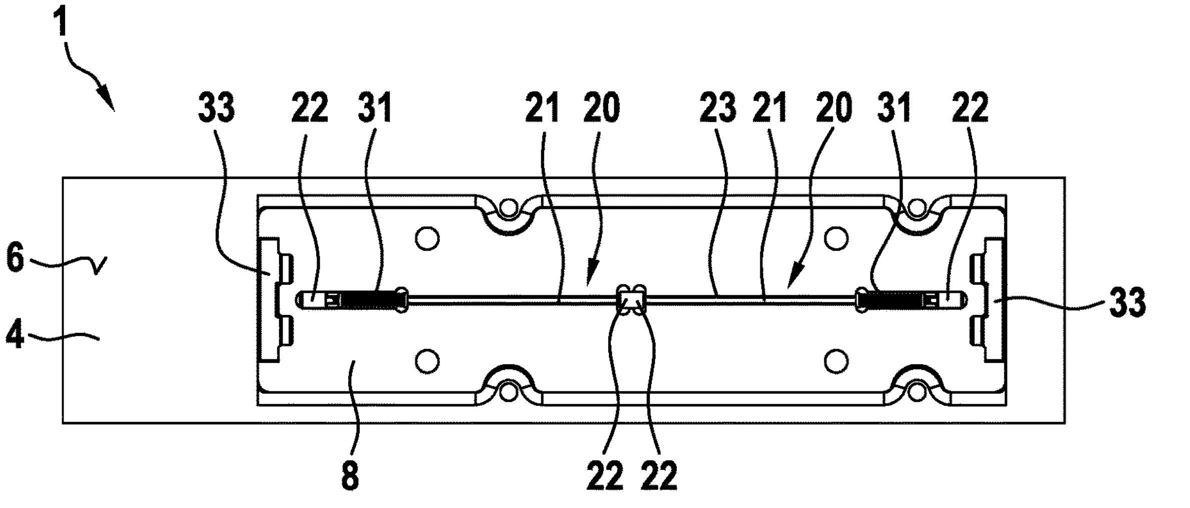
Figure 18:
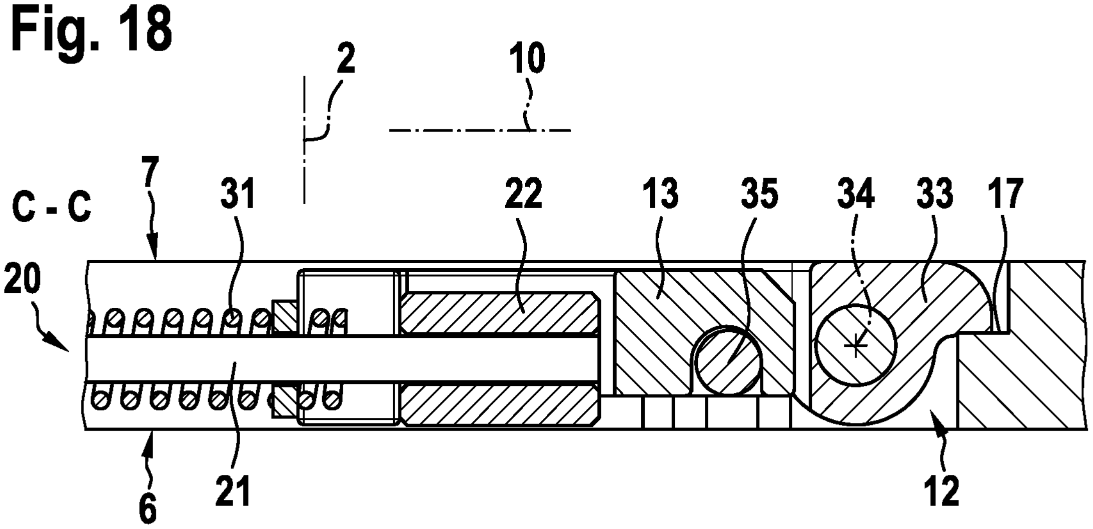
Figure 18:
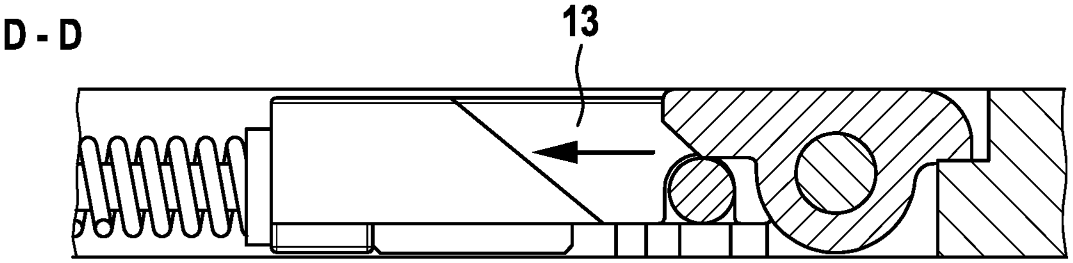
Figure 18:
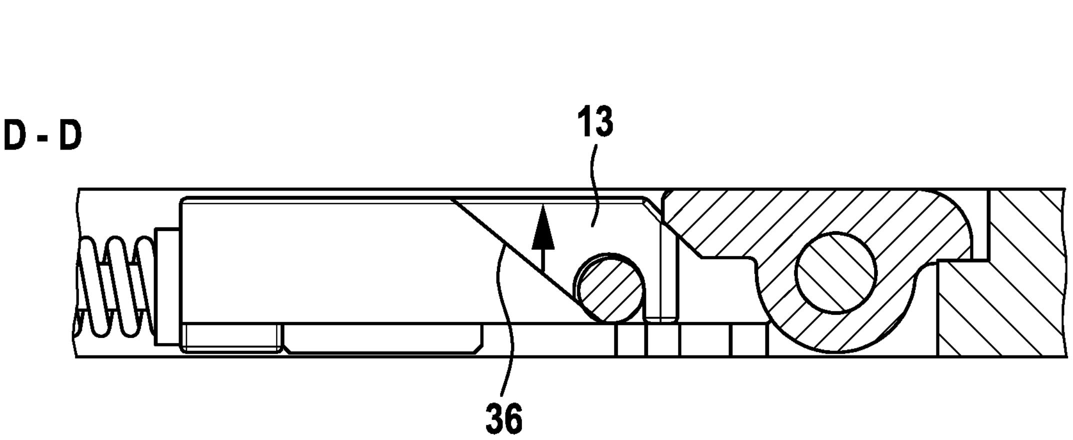

FIGS. 16 to 19 show the fourth exemplary embodiment in different variants: FIG. 16 shows the front side 7 of the backplate 1. FIG. 17 shows the backside 6 of the backplate 1. In a diagrammatic illustration with the sections C-C and D-D, FIG. 18 shows the movement of the connecting assembly 5 from the retaining position to the release position.

In the fourth exemplary embodiment are provided two counter-directional bar elements 13 movable towards each other. However herein, the bar elements 13 do not directly positively engage in the second mounting element 4, but, via a transverse element 35, block a swivel movement of a swivel bar 33. In turn the swivel bar 33 positively engages on the shoulder 17 in the receiving recess 12 of the second mounting element 4.

As explained in FIGS. 16 to 18, two swivel bars 33 are disposed on both sides at the base plate 8. The swivel bars 33 are rotatable about one respective swivel bar axis 34. Herein the swivel bar axis 34 is parallel to the vertical axis 11.

As FIG. 17 reveals, the two bar elements 13 are movable towards each other by two shape memory elements 21. With the end pieces 22, which are located in the centre, the shape memory elements 21 are fastened to the base plate 8. Obviously herein, the two shape memory elements 21 can travel parallel past each other, as it is the case in the first exemplary embodiment. Furthermore herein, only one shape memory element 21 can move the two mounting elements 13 towards each other.

As clarified in FIG. 18, the bar element 13 can pull the transverse element 35 inwards, which herein is formed as a rolling rod. Thereby, the swivel bar 33 can rotate about the swivel bar axis of rotation 34, whereby the form closure to the second mounting element 4 loosens.

As revealed in the third illustration in FIG. 18, the bar element 13 travels over an inclined plane 36. Said inclined plane 36 effects that during the movement thereof to the release position, the bar element 13 is moved parallel to the mounting axis 2 and in this case in the direction of the door actuator 102. Thus, the inclined plane 36 and the correspondingly moving bar element 13 exert a force onto the door actuator 102 for pushing the same away from the mounting surface 101.

The movement of the bar element 13 parallel to the mounting axis 2 via the inclined plane 36 is clarified by way of example in this fourth exemplary embodiment, however, can be applied as well to the other exemplary embodiments with mobile bar element.

Figure 19:
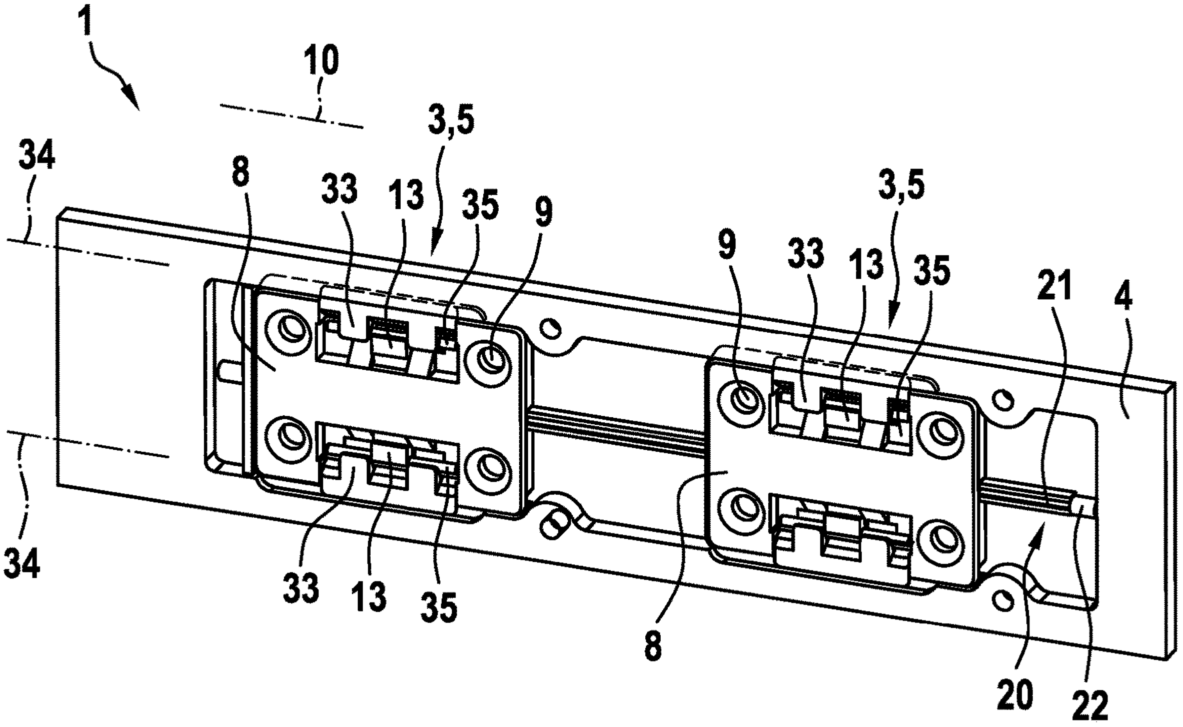

FIG. 19 clarifies a variant of the fourth exemplary embodiment, in which four bar elements 13 are used, which are mobile parallel to the vertical axis 11. Furthermore, four swivel bars 33 are used, the swivel bar axis of rotation 34 being parallel to the longitudinal axis 10. Via a common shape memory assembly 20, the four bar elements 13 are moved to the release position and thereby again pull the transverse elements 35 from underneath the branches of the swivel bars 33.

FIGS. 20 to 25 show various variants of the fifth exemplary embodiment. In the fifth exemplary embodiment, the bar elements 13 are not linearly mobile, but rotationally mobile. The associated bar axes of rotation 38 are parallel to the mounting axis 2.

Figure 20:
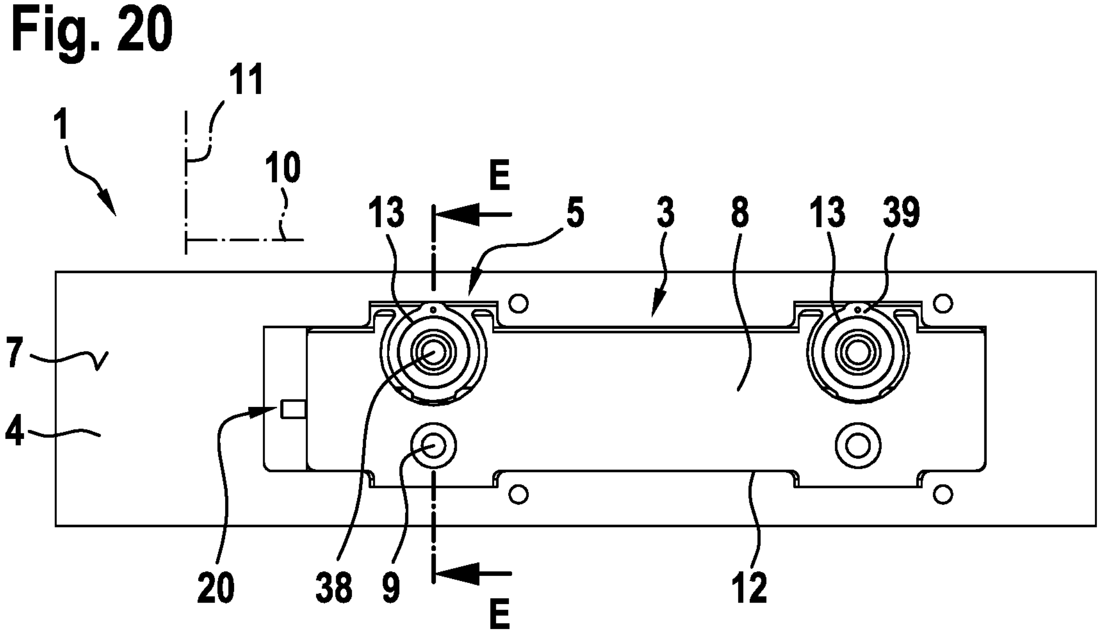
Figure 21:
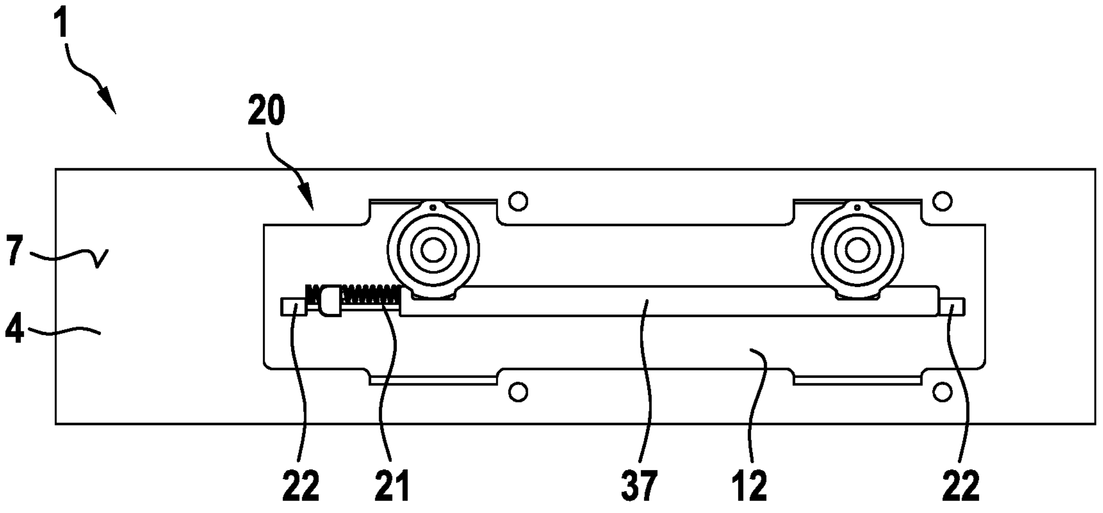
Figure 22:
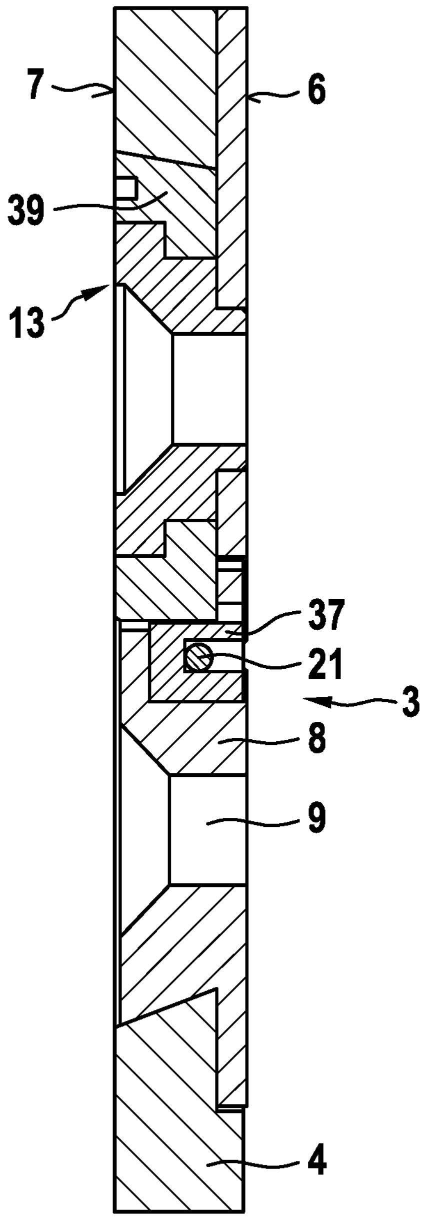

FIG. 20 shows the front side 7 of the backplate 1. In FIG. 21, for the sake of clarity, the base plate 8 is masked. FIG. 22 shows the section E-E identified in FIG. 20.

As in particular FIG. 21 clarifies, herein, a transmission rod 37 is provided, which extends parallel to the longitudinal axis 10 and, with the shape memory assembly 20, is movable parallel to the longitudinal axis 10. In particular, the shape memory element 21 protrudes through the transmission rod 37 and, at one end, is connected with a corresponding end piece 22 to the transmission rod 37. In particular, the other end piece 22 is connected to the base plate 8.

The transmission rod 37 and the rotatable bar elements 13 are connected to each other such as to convert the linear movement of the transmission rod 37 to a rotary movement of the bar elements 13.

The section in FIG. 22 clarifies that the corresponding bar element 13, herein at the top side, has a conical cam 39, which, in the retaining position, is positively connected to the second mounting element 4. By rotating the bar element 13 by a few degrees, said positive connection to the second mounting element 4 loosens.

The conical cam 39 and the conical surface, which is complementary thereto, at the second mounting element 4, allow for a play-free connection of the two mounting elements 3, 4.

Figure 23:
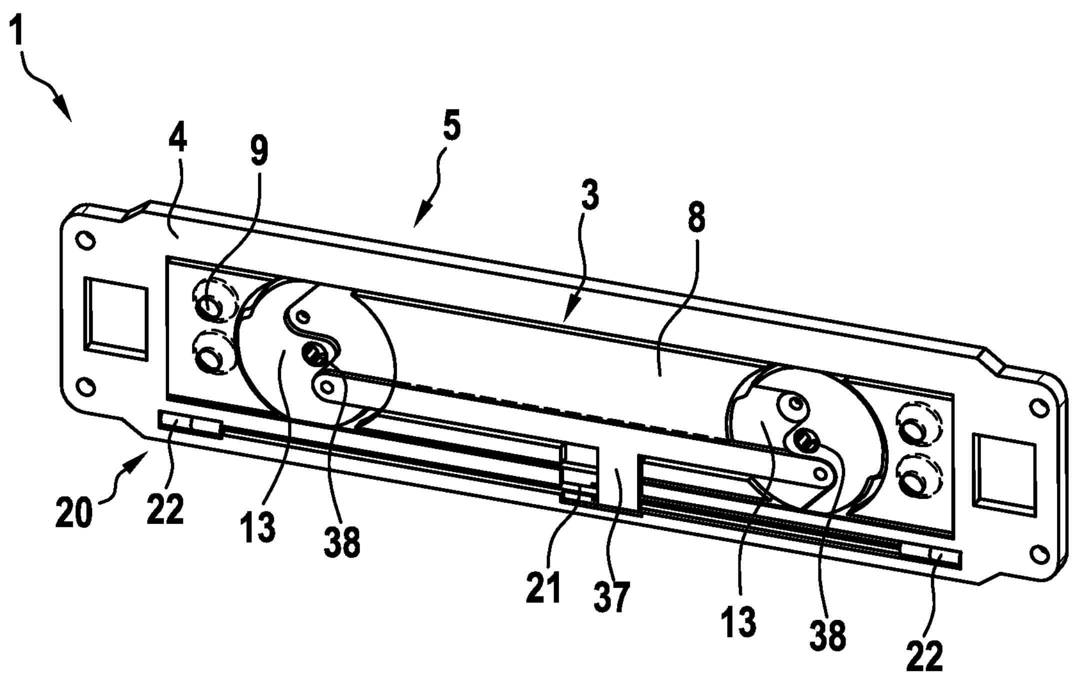

FIG. 23 shows a variant of the fifth exemplary embodiment, in which the two bar elements 13 are provided, and each bar element 13 positively engages in the second mounting element 4 both at the top side and at the underside thereof. Again herein, the two bar elements 13 are rotated with the transmission rod 37, which is linearly moved by means of at least one shape memory assembly 20.

Figure 24:
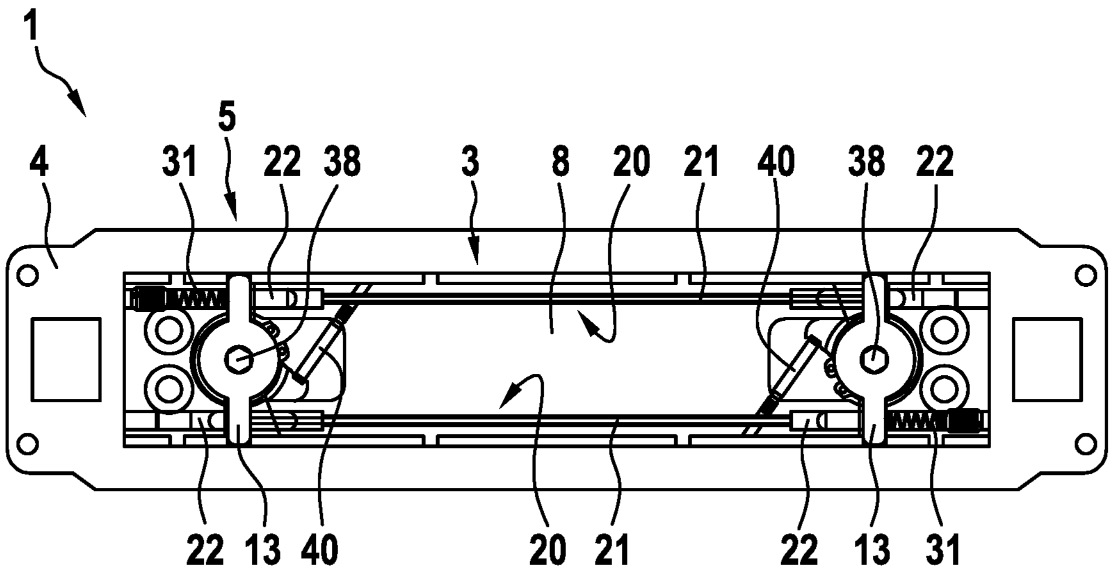

FIG. 24 shows a further variant of the fifth exemplary embodiment, in which, just as in FIG. 23, interlocking is realized via four points. Herein, a rotatable bar forms the respective bar element 13 and, in the retaining position, extends along the vertical axis 11. In this case, the bar element 13 is positively connected at the top and bottom to the second mounting element 4.

For loosening the connection, two shape memory assemblies 20 are provided for rotating the two bar elements 13.

By way of example for all exemplary embodiments, FIG. 24 clarifies that at least one blocking element 40 can be employed in the backplate 1. In the herein shown example, the blocking element 40 is a glass vial filled with fluid, which is destroyed upon corresponding thermal activation. The blocking element 40 allows for retaining the connecting assembly 5, in particular the bar element 13, in the retaining position. It is only upon thermal activation of the blocking element 40 that the blocking thereof loosens, and the connecting assembly 5 can be moved to the release position.

Figure 25:
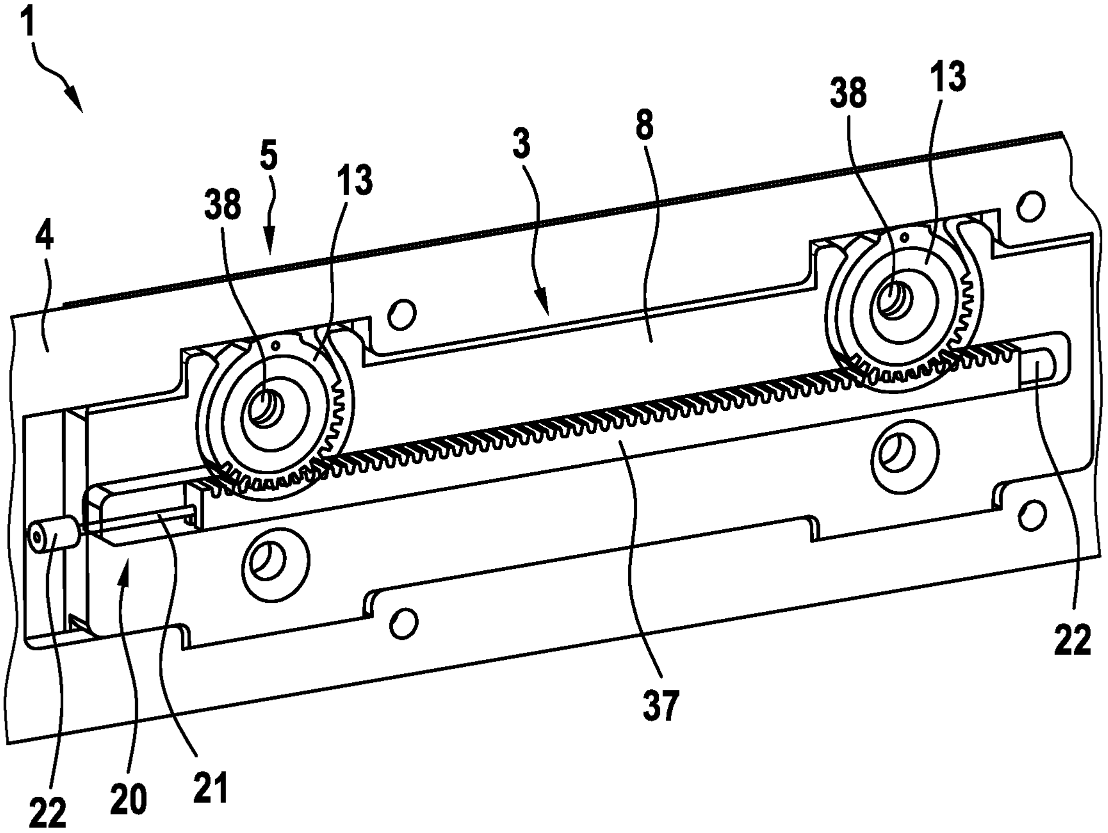

FIG. 25 shows a further variant of the fifth exemplary embodiment. It is shown herein, that the transmission rod 37 can have a toothed rack. Correspondingly, the rotatable bar elements 13 are formed as toothed wheels, which mesh with the toothed rod. This way as well allows for converting the linear mobile transmission rod 37 to a rotatable movement of the bar elements 13.

Figure 26:
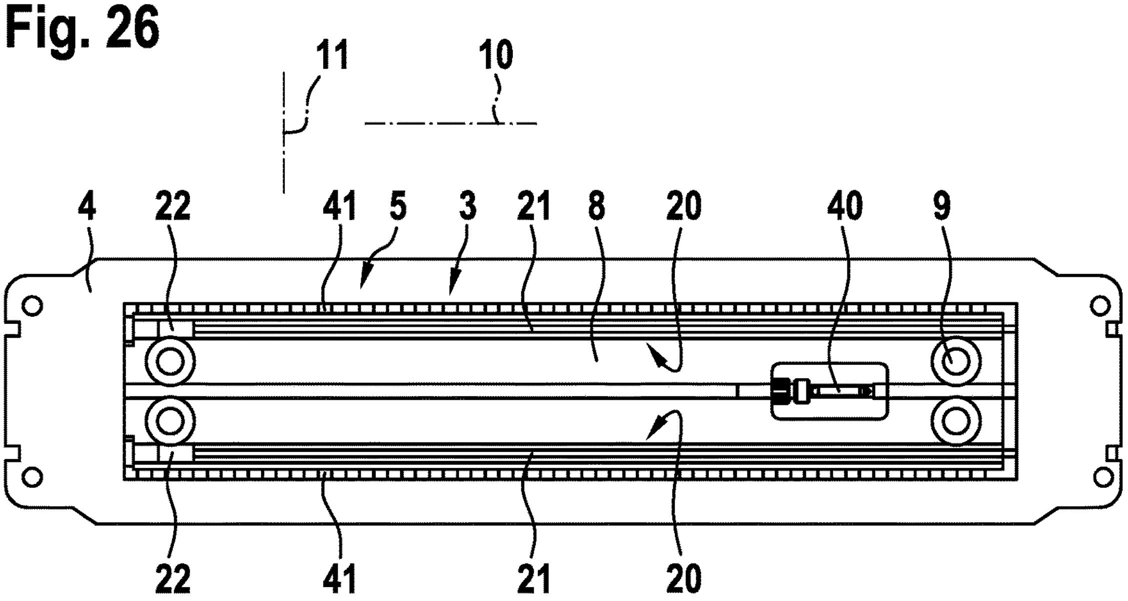
Figure 27:
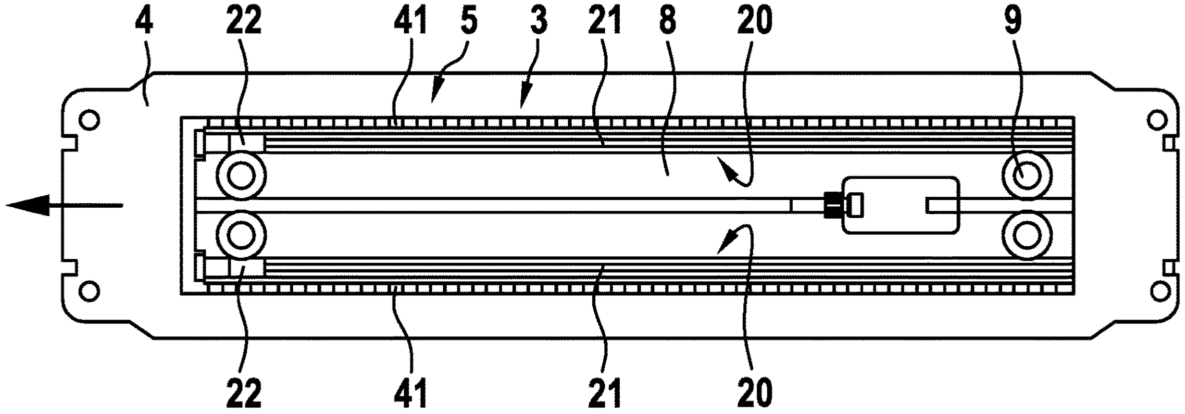
Figure 28:
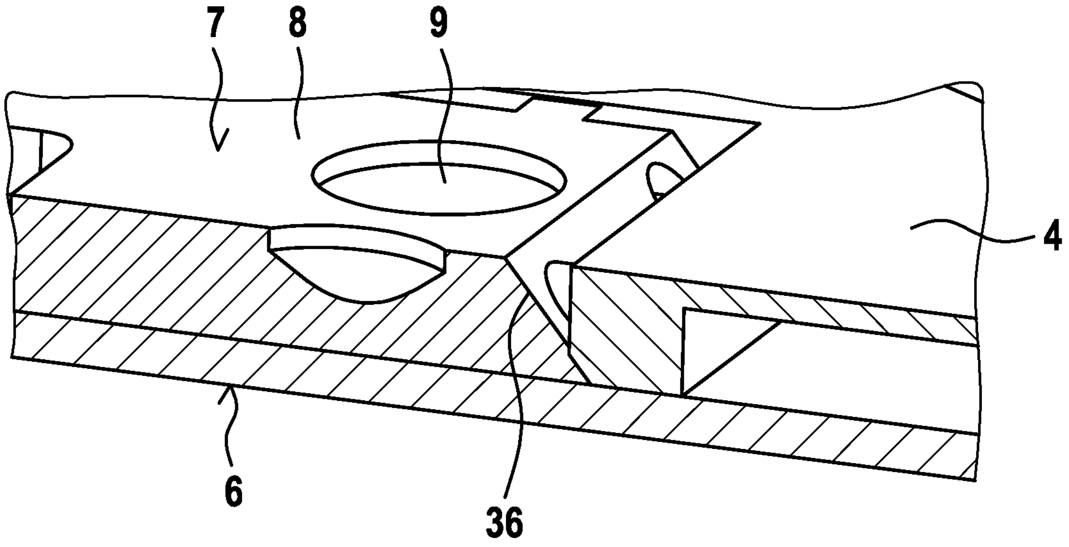

FIGS. 26 to 28 show a sixth exemplary embodiment of the backplate 1: This sixth exemplary embodiment does not provide for standalone bar elements 13. Rather, the connecting assembly 5 is formed directly by corresponding shaping of the two mounting elements 3, 4 as a form closure assembly 41. As clarified in FIGS. 26 and 27, the form closure assembly 41 comprises a plurality of toothed form closure elements between the base plate 8 and the inner border of the second mounting element 4, which elements engage in each other for forming the form closure assembly 41.

FIG. 27 shows the release position, in which, compared to FIG. 26, the second mounting element 4 was moved to the left. Two shape memory assemblies 20 perform this movement. With the right end pieces 22 thereof, the two shape memory assemblies 20 are fastened to the second mounting element 4. The left end pieces 22 are connected to the right mounting element 3. Thereby, when the shape memory elements 21 contract, the second mounting element 4 can be moved; the first mounting element 3 is firmly screwed to the mounting surface 101.

The form closure assembly 41 is formed such that it loosens upon relative movement between the two mounting elements 3, 4.

FIGS. 26 and 27 also show diagrammatically how one blocking element 40, for example formed as a fluid-filled glass vial, is able to block the movement or the loosening of the connecting assembly 5.

FIG. 28 clarifies that an inclined plane 36 can be used even without bar element 13 for generating a movement, herein of the second mounting element 4, parallel to the mounting axis 2, simultaneously with the loosening of the connecting assembly 5, for promoting detaching of the door actuator 102 from the mounting surface 101.

Figure 29:
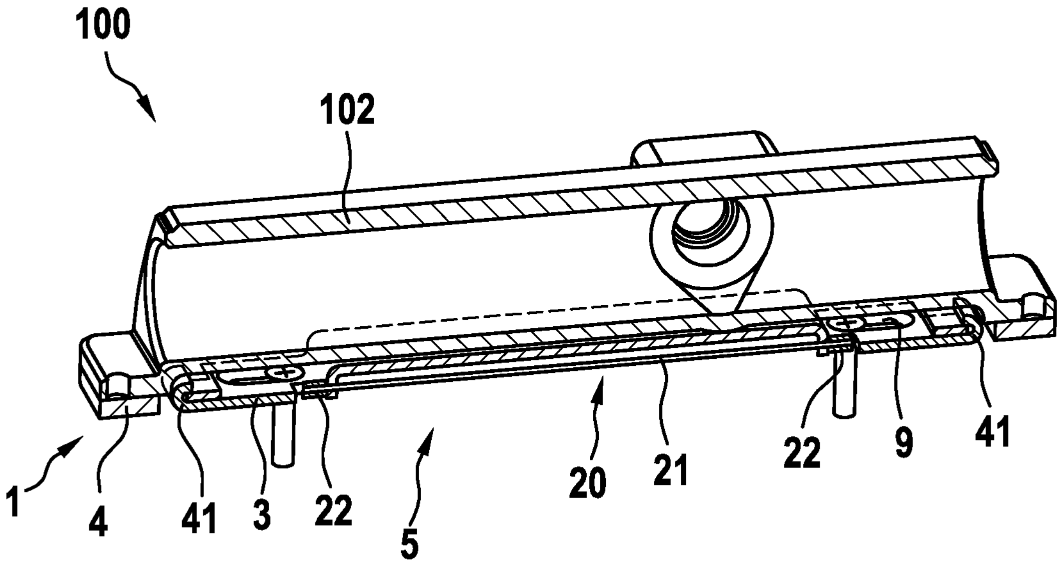

FIG. 29 shows a seventh exemplary embodiment of the backplate 1. In this seventh exemplary embodiment, the first mounting element 3 is formed bent and the shape memory assembly 20 is disposed so as to deform the first mounting element 3. As FIG. 29 clarifies, the shape memory element 21, with both end pieces 22, is connected to the first mounting element 3. In case the length of the shape memory element 21 shortens based on thermal activation, the first mounting element 3 contracts and thereby deforms. Herein, the fastening holes 9 are configured as oblong holes for allowing for the deformation. The form closure assembly 41 is formed between the two mounting elements 3, 4 so that the deformation of the first mounting element 3 loosens the form closure assembly 41.

Figure 30:
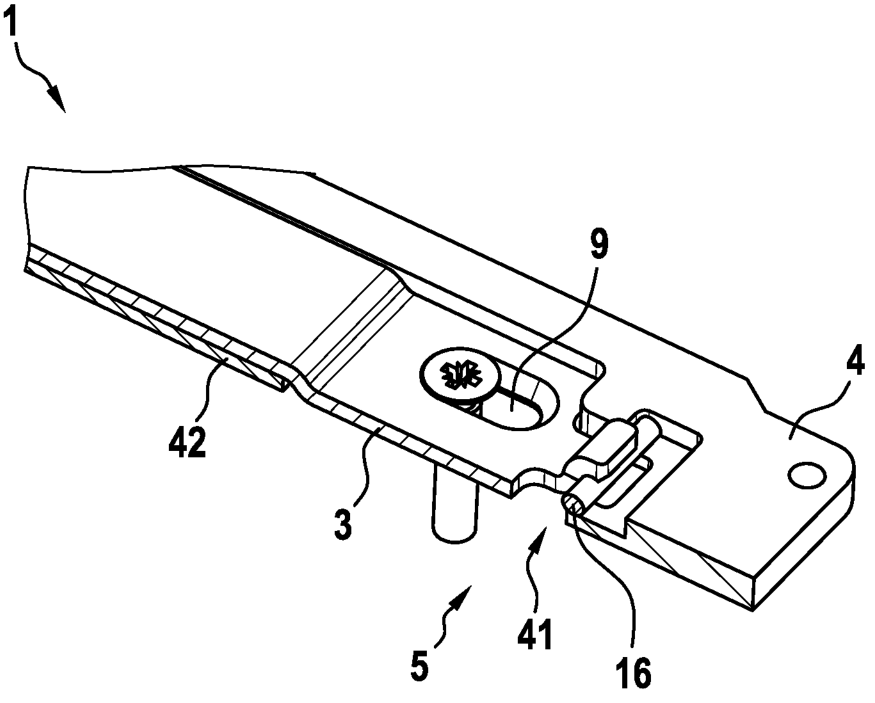

FIG. 30 shows an eighth exemplary embodiment of the backplate 1, wherein herein only a detail is shown. Again the two mounting elements 3, 4 are connected to each other via the form closure assembly 41. For promoting loosening of said form closure assembly 41, a rolling body 16 is inserted at the form closure assembly 41 between the two mounting elements 3, 4.

In the eighth exemplary embodiment, additionally or as an alternative, the deformation of the first mounting element 3 is achieved by means of the shape memory assembly 20 with a swell pad 42. Said swell pad 42 is positioned between first mounting element 3 and mounting surface 101 and is made from thermally intumescent material, which expands at corresponding temperature and thus deforms the first mounting element 3.

Figure 31:
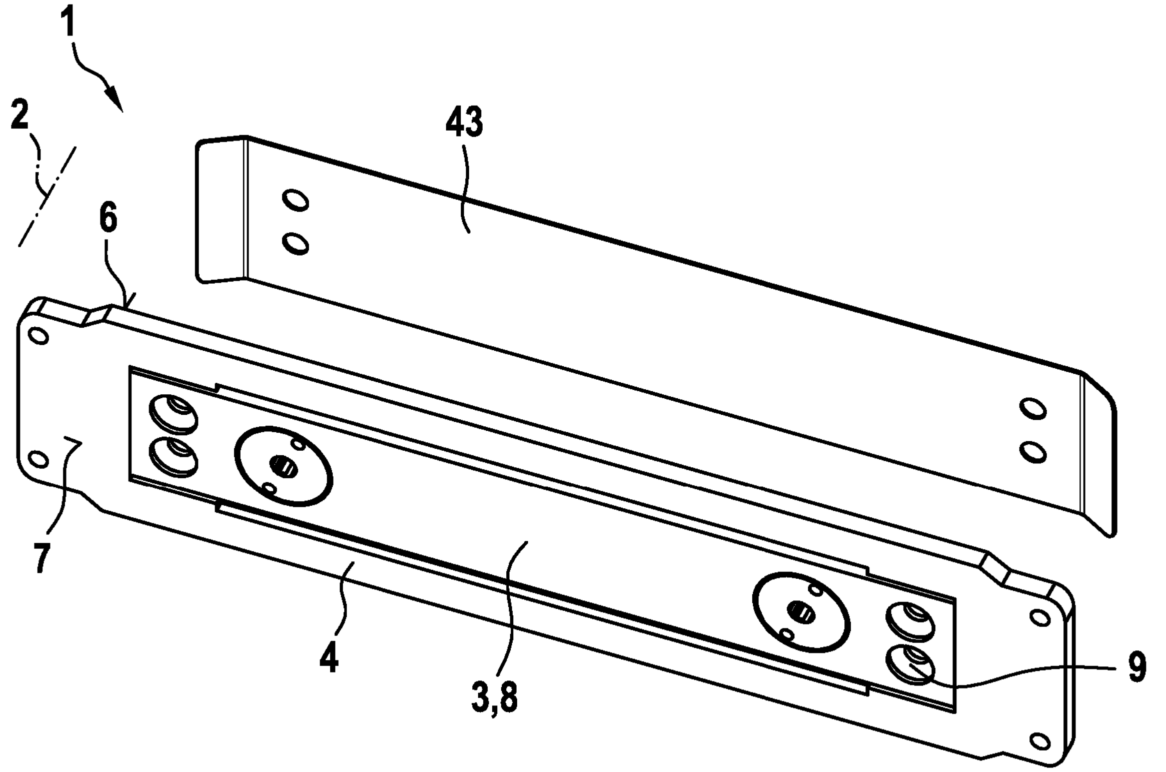
Figure 32:
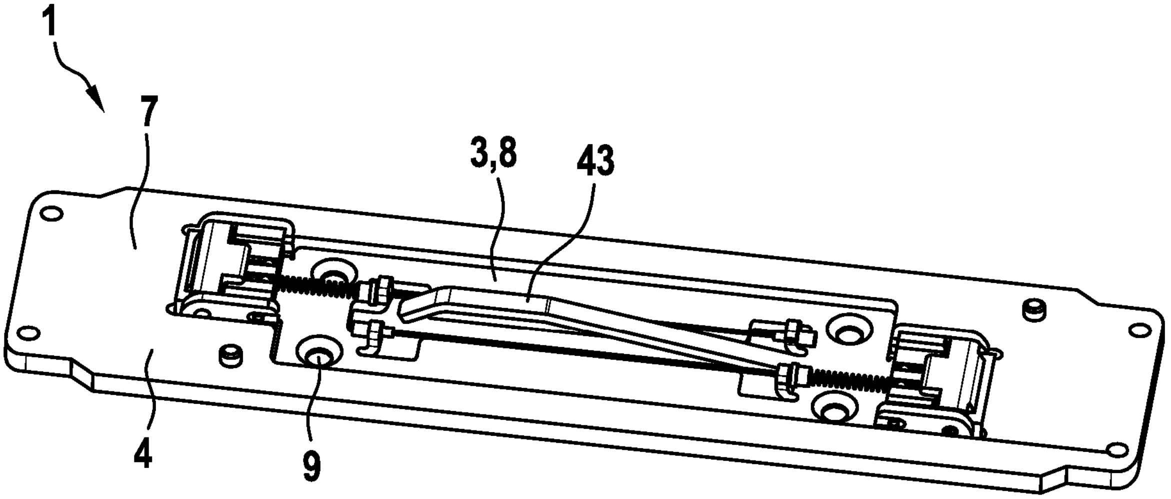

FIGS. 31 and 32 show details, which can be realized in all exemplary embodiments. According to these two Figures, a detaching element 43 is used, which charges the door actuator 102 and/or the second mounting element 4 so as to move the door actuator 102 away from the mounting surface 101.

According to the FIGS. 31, 32, the detaching element 43 is formed as a spring. FIG. 31 shows a plate-shaped spring, which is inserted between mounting surface 101 and backplate 1 and thereby acts on the second mounting element 4.

FIG. 32 shows that the detaching element 43, as an integral spring, is bent out of the base plate 8. Said spring, incorporated into the base plate 8, directly acts onto the door actuator 102.

Additionally or as an alternative to the shown elastic detaching elements 43, also thermally intumescent material can be employed, which, upon thermal activation, expands and thereby pushes away the second mounting element 4 and/or the door actuator 102.

The invention claimed is:

1. A backplate for a door actuator, comprising:

a first mounting element and a second mounting element, wherein the first mounting element is formed for fastening to a mounting surface, and the second mounting element is formed for accommodating the door actuator, a connecting assembly, which, in a retaining position, keeps the first and second mounting elements together, and, in a release position, does not keep the first and second mounting elements together, and a shape memory assembly with a first shape memory element made from shape memory material, wherein, upon thermal activation, the shape memory assembly moves the connecting assembly to the release position.

2. The backplate according to claim 1, wherein the first shape memory element is a wire or a rod or a spring, wherein, upon thermal activation, the first shape memory element changes a length thereof.

3. The backplate according to claim 1, wherein the first shape memory element, at least partially, extends through a receiving groove and/or a circumferentially closed channel, wherein the receiving groove and/or the channel is formed in the first mounting element.

4. The backplate according to claim 1, wherein the connecting assembly comprises a first bar element, which is movably disposed at the first mounting element and is movable from the retaining position thereof to the release position, and wherein, upon thermal activation, the shape memory assembly moves the first bar element to the release position.

5. The backplate according to claim 4, further comprising a second bar element, wherein the first and second bar elements are counter-directional bar elements, wherein two ends of the shape memory assembly are connected to the first and second counter-directional bar elements so that, upon thermal activation, the shape memory assembly simultaneously moves the first and second bar elements.

6. The backplate according to claim 4, further comprising a second bar element and a second shape memory assembly, wherein one end of each shape memory assembly is connected to a respective one of the first and second bar elements and an opposite end of each shape memory assembly is connected to the first mounting element.

7. The backplate according to claim 4, further comprising a second bar element, wherein the first and second bar elements are counter-directional bar elements and the shape memory assembly is disposed for transferring force onto both the first and second bar elements so that, upon thermal activation, the shape memory assembly simultaneously moves the first and second bar elements.

8. The backplate according to claim 4, wherein at least one rolling body is disposed, between the first bar element and the first mounting element and/or between the first bar element and the second mounting element.

9. The backplate according to claim 4, wherein the first bar element is supported linearly movable at the first mounting element.

10. The backplate according to claim 9, wherein the first bar element has a guide, wherein a guide extension, which is integrally shaped at the first mounting element, protrudes into the guide.

11. The backplate according to claim 9, wherein a swivel bar is disposed between the first bar element and the second mounting element.

12. The backplate according to claim 4, wherein the first bar element is supported rotationally movable at the first mounting element.

13. The backplate according to claim 4, wherein the shape memory assembly is disposed for deforming the first bar element.

14. The backplate according to claim 4, wherein, when moving to the release position, the first bar element is movable over an inclined plane, so that the first bar element moves away for pushing away the door actuator from the mounting surface.

15. The backplate according to claim 1, wherein the connecting assembly comprises a form closure assembly between the first and second mounting elements, wherein, upon thermal activation for releasing the form closure assembly, the shape memory assembly:

displaces the second mounting element in relation to the first mounting element to the release position, or deforms one of the first and second mounting elements to the release position.

16. The backplate according to claim 1, comprising a detaching element, with thermally intumescent material and/or a spring, which is disposed for pushing away the door actuator from the mounting surface.

17. The backplate according to claim 1, wherein the first mounting element comprises a base plate.

18. The backplate according to claim 1, wherein the second mounting element is formed as a plate; the plate comprising a receiving recess for disposing the first mounting element in the second mounting element.

19. The backplate according to claim 1, wherein the backplate has a thickness of maximum 6 mm.

20. An assembly comprising a backplate according to claim 1 and a door actuator, which is fastened to the backplate.

* * * * *